United States Patent
Kasako

(10) Patent No.: US 8,527,723 B1
(45) Date of Patent: Sep. 3, 2013

(54) STORAGE SYSTEM AND CONTROL METHOD FOR STORAGE SYSTEM

(75) Inventor: Naohisa Kasako, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/522,556

(22) PCT Filed: May 10, 2012

(86) PCT No.: PCT/JP2012/062057
§ 371 (c)(1), (2), (4) Date: Jul. 17, 2012

(51) Int. Cl.
*G06F 12/16* (2006.01)

(52) U.S. Cl.
USPC ............ 711/162; 711/161; 711/165; 714/6.1; 714/6.23

(58) Field of Classification Search
USPC ................... 711/161, 162, 165; 714/6.1, 6.23
See application file for complete search history.

(56) References Cited

U.S. PATENT DOCUMENTS

| | | | |
|---|---|---|---|
| 6,380,778 B2 * | 4/2002 | Uehara et al. | 327/175 |
| 6,636,462 B1 * | 10/2003 | Drynkin et al. | 369/30.19 |
| 7,111,014 B2 * | 9/2006 | Sawdon et al. | 1/1 |
| 7,352,671 B2 * | 4/2008 | Ando et al. | 369/53.2 |
| 2003/0002864 A1 * | 1/2003 | Mollie et al. | 386/125 |
| 2008/0177964 A1 | 7/2008 | Takahashi et al. | |
| 2009/0094427 A1 | 4/2009 | Sano | |
| 2009/0307413 A1 * | 12/2009 | Chu | 711/103 |
| 2011/0106766 A1 | 5/2011 | Takahashi et al. | |
| 2012/0131287 A1 | 5/2012 | Nishina et al. | |

FOREIGN PATENT DOCUMENTS

| | | | |
|---|---|---|---|
| JP | 2008181288 A | 8/2008 | |
| JP | 2009-093315 A | 4/2009 | |

* cited by examiner

*Primary Examiner* — Jae Yu
(74) *Attorney, Agent, or Firm* — Volpe and Koenig, P.C.

(57) ABSTRACT

A first controller defines an existing pair that represents a copy from a first existing area that is a storage area of a first logical volume before size expansion to a second existing area that is a storage area of a second logical volume before size expansion, maintains the existing pair in a synchronous state, which is a state where the second existing area is in synchronization with the first existing area, and expands the size of the first logical volume by adding a first expansion area using a first storage device to the first logical volume during the synchronous state, and the second controller adds a second expansion area using a second storage device to the second logical volume after the size of the first logical volume is expanded, and writes data written to the first expansion area to the second expansion area.

8 Claims, 31 Drawing Sheets

FIG. 6

VOLUME MANAGEMENT INFORMATION ~T10

| VOL# | SIZE | TYPE | STATUS | ATTRIBUTE | SIZE CHANGE RESULT | CHANGED SIZE | SIZE TO REPLY TO HOST |
|---|---|---|---|---|---|---|---|
| | C101 | C102 | C103 | C104 | C105 | C106 | C107 |
| 0 | 100GB | NORMAL | NORMAL | ALLOCATED | SUCCESS | 110GB | 100GB |
| 1 | 50MB | NORMAL | NORMAL | UNALLOCATED | FAILURE | 50MB | 50MB |
| 2 | 1TB | POOL | BLOCKED | ALLOCATED | — | 1TB | 1TB |
| ... | ... | ... | ... | ... | ... | ... | ... |

FIG. 7

| PAIR # | PRIMARY VOLUME # | SECONDARY VOLUME # | PAIR STATE | EXPANSION PAIR STATE |
|---|---|---|---|---|
| 0 | 10 | 11 | PAIR | PSUS |
| 1 | 10 | 12 | PSUS | PSUS |
| 2 | 20 | 21 | COPY | — |
| ... | ... | ... | ... | ... |

PAIR MANAGEMENT INFORMATION (T11)

Columns: C110, C111, C112, C113, C114

FIG. 10

| SERVER CORRESPONDENCE MANAGEMENT INFORMATION | | | T30 |
|---|---|---|---|
| C300 | C301 | C302 | |
| SERVER ID | STORAGE APPARATUS ID | VOLUME # | |
| SERVER A | STORAGE APPARATUS A | A | |
| SERVER A | STORAGE APPARATUS B | B | |
| SERVER B | STORAGE APPARATUS B | C | |
| ... | ... | ... | |

ND CONTROL METHOD FOR STORAGE SYSTEM

STORAGE SYSTEM AND CONTROL METHOD FOR STORAGE SYSTEM

TECHNICAL FIELD

The present invention relates to a technique of synchronizing a plurality of logical volumes with each other in a storage system.

BACKGROUND ART

As well known, storage systems have a copy function that involves synchronizing data in a logical volume with data in another logical volume. Users can use the copy function to create a backup of task data, for example.

There is known a technique of expanding or reducing the sizes of a copy source volume and a copy destination volume of a copy pair comprising two logical volumes and the size of the differential bit map for the volumes (see Patent Literature 1, for example).

CITATION LIST

Patent Literature

Patent Literature 1: Japanese Patent Laid-Open No. 2009-93315

SUMMARY OF INVENTION

Technical Problem

According to such a technique, the sizes of the copy source logical volume and the copy destination logical volume of a copy pair have to be changed substantially concurrently.

Solution to Problem

In order to solve the problem described above, a storage system according to an aspect of the present invention comprises: a first storage device; a first controller that creates a first logical volume using the first storage device; a second storage device; and a second controller that is connected to the first controller via a network and creates a second logical volume using the second storage device. The first controller defines an existing pair that represents a copy from a first existing area that is a storage area of the first logical volume before size expansion to a second existing area that is a storage area of the second logical volume before size expansion. The first controller maintains the existing pair in a synchronous state, which is a state where the second existing area is in synchronization with the first existing area. The first controller expands the size of the first logical volume by adding a first expansion area using the first storage device to the first logical volume during the synchronous state. The second controller expands the size of the second logical volume by adding a second expansion area using the second storage device to the second logical volume after the size of the first logical volume is expanded, and writes data written to the first expansion area to the second expansion area.

Advantageous Effects of Invention

After the size of a copy source volume is expanded, the size of a copy destination volume can be expanded at any time while maintaining the synchronous state of the copy pair before the size expansion.

BRIEF DESCRIPTION OF DRAWINGS

FIG. 6 shows volume management information T10.
FIG. 7 shows pair management information T11.
FIG. 10 shows server correspondence management information T30.

DESCRIPTION OF EMBODIMENTS

In the following, embodiments of the present invention will be described with reference to the drawings.

A technique of synchronizing data in a copy destination storage apparatus with data in a copy source storage apparatus will be described. The technique is classified into two known types: local copy in which data in a copy source in a housing is transferred to a copy destination in the same housing and remote copy (replication) in which data in a copy source in a housing is transferred to a copy destination in another housing. The remote copy is classified into two known types: synchronous copy and asynchronous copy. The synchronous copy is to transfer and write data to the copy destination at the same time as writing the data to the copy source. The asynchronous copy is to transfer and write data to the copy destination after writing the data to the copy source.

Embodiment 1

In an embodiment 1, a storage system using synchronous copy will be described.

Configuration of Computer System

In the following, a configuration of a computer system will be described.

Figure 1:
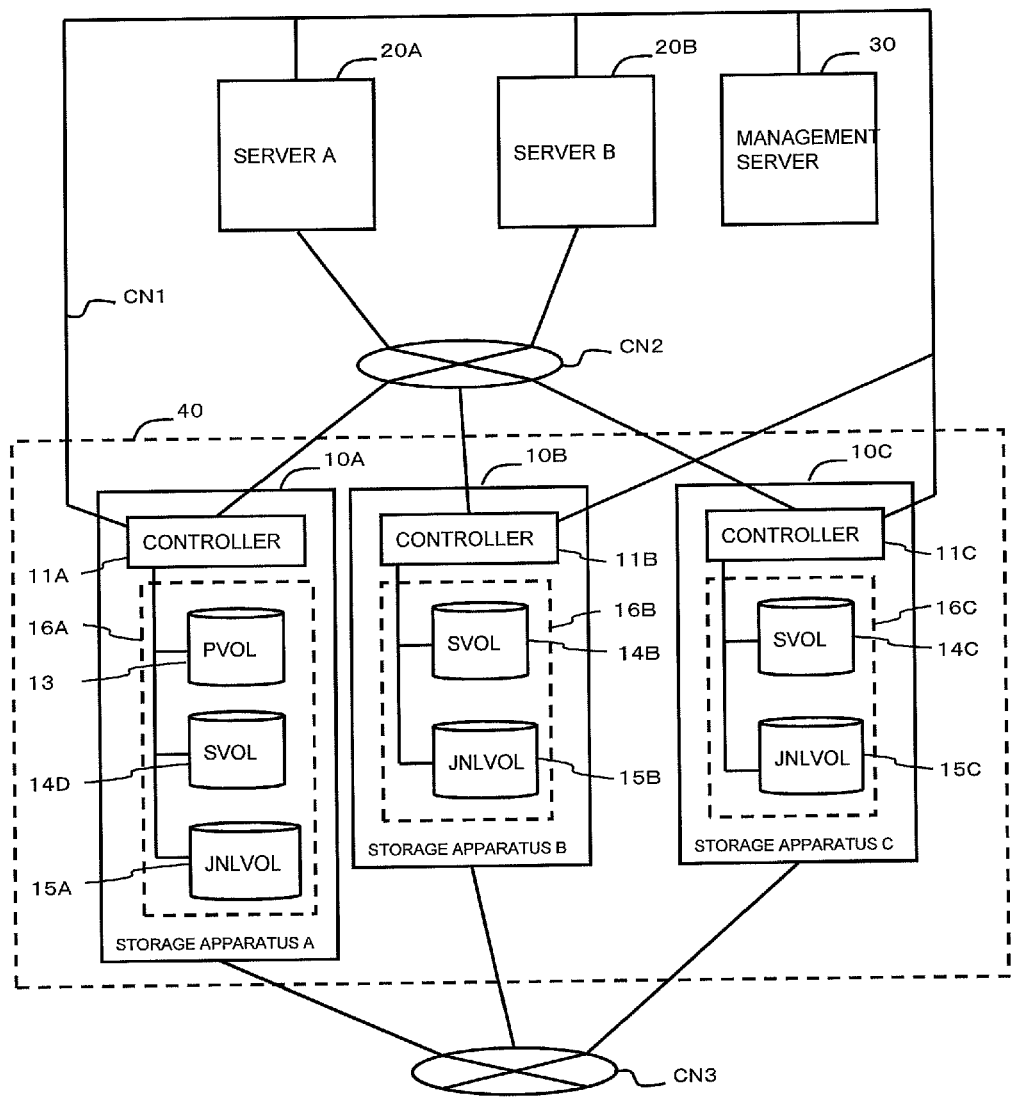
FIG. 1 shows a computer system.

FIG. 1 shows a computer system. The computer system includes a storage system 40, a plurality of servers 20A and 20B and at least one management server 30, for example. The storage system 40 includes a plurality of storage apparatuses 10A, 10B and 10C.

The management server 30 is connected to the storage apparatuses 10A, 10B and 10C and the servers 20A and 20B via a management communication network CN1. The servers 20A and 20B and the storage apparatuses 10A, 10B and 10C are connected to each other via a data input/output communication network CN2. The storage apparatuses 10A, 10B and 10C are connected to each other via a remote copy communication network CN3.

The communication network CN1 is configured as a local area network (LAN), for example. The communication networks CN2 and CN3 can be an Internet protocol-storage area network (IP-SAN) or a fibre channel-storage area network (FC-SAN), for example. The communication networks CN1, CN2 and CN3 may be a single communication network. Alternatively, the communication networks CN2 and CN3 may be a single communication network, whereas the communication network CN1 may be a different communication network. In the following description, data input/output will be expressed as "I/O".

The storage apparatuses 10A, 10B and 10C store data used by the servers 20A and 20B. The storage apparatus 10A includes a controller 11A and a storage device 16A. The storage apparatus 10B includes a controller 11B and a storage device 16B. The storage apparatus 10C includes a controller 11C and a storage device 16C. The storage device 16A includes a primary volume (PVOL) 13, a secondary volume (SVOL) 14D and a journal volume (JNLVOL) 15A, which are logical volumes created therein. The storage device 16B includes a secondary volume 14B and a journal volume 15B, which are logical volumes created therein. The storage device 16C includes a secondary volume 14C and a journal volume 15C, which are logical volumes created therein. In the following description, a logical volume may sometimes be referred to simply as a volume.

The primary volume 13 and the secondary volume 14B can form a copy pair. The primary volume 13 and the secondary volume 14C can form a copy pair. The primary volume 13 and the secondary volume 14D can form a copy pair. Local copy occurs in the copy pair of the primary volume 13 and the secondary volume 14D. Remote copy occurs in the copy pair of the primary volume 13 and the secondary volume 14B and the copy pair of the primary volume 13 and the secondary volume 14C. A controller 11 can define the copy pairs.

The storage system 40 can perform synchronous copy even if the storage system 40 does not have the storage apparatus 10C. The storage system 40 can perform synchronous copy even if the storage apparatuses 10A and 10B do not have the journal volumes 15A and 15B. The storage system 40 can perform asynchronous copy even if the storage system 40 does not have the storage apparatus 10B. The storage system 40 can perform remote copy even if the storage apparatus 10A does not have the secondary volume 14D.

The servers 20A and 20B perform various task processings, such as customer management, image distribution and e-mail management. To perform a tack processing, the servers 20A and 20B accesses a logical volume in the storage apparatus 10A, 10B or 10C to read or write data. The servers 20A and 20B may be a host computer, such as a server computer, a main frame computer, a personal computer, an engineering work station and a personal digital assistant.

The management server 30 is a computer for managing the computer system. The management server 30 manages each component of the computer system and the state thereof, for example. The management server 30 issues a command for pair operation to the storage apparatuses 10A, 10B and 10C.

As with the servers 20A and 20B, the management server 30 can be one of a variety of computers. The management server 30 may include a plurality of computers. For example, a management terminal to be manipulated by a user (a system manager or the like) may be provided, and the management server 30 may be connected to the management terminal. The user can use the management terminal to issue an instruction to the management server 30 or display information acquired from the management server 30. The management terminal can be a personal computer or a personal digital assistant (including a cellular phone).

In the following description, each of the storage apparatuses 10A, 10B and 10C will be referred to as a storage apparatus 10 unless otherwise required by context. Similarly, each of the controllers 11A, 11B and 11C will be referred to as a controller 11 unless otherwise required by context. Similarly, each of the storage devices 16A, 16B and 16C will be referred to as a storage device 16 unless otherwise required by context. Similarly, each of the servers 20A and 20B will be referred to as a server 20 unless otherwise required by context. Similarly, each of the secondary volumes 14B, 14C and 14D will be referred to as a secondary volume 14 unless otherwise required by context. Similarly, each of the journal volumes 15A, 15B and 15C will be referred to as a journal volume 15 unless otherwise required by context.

Figure 2:
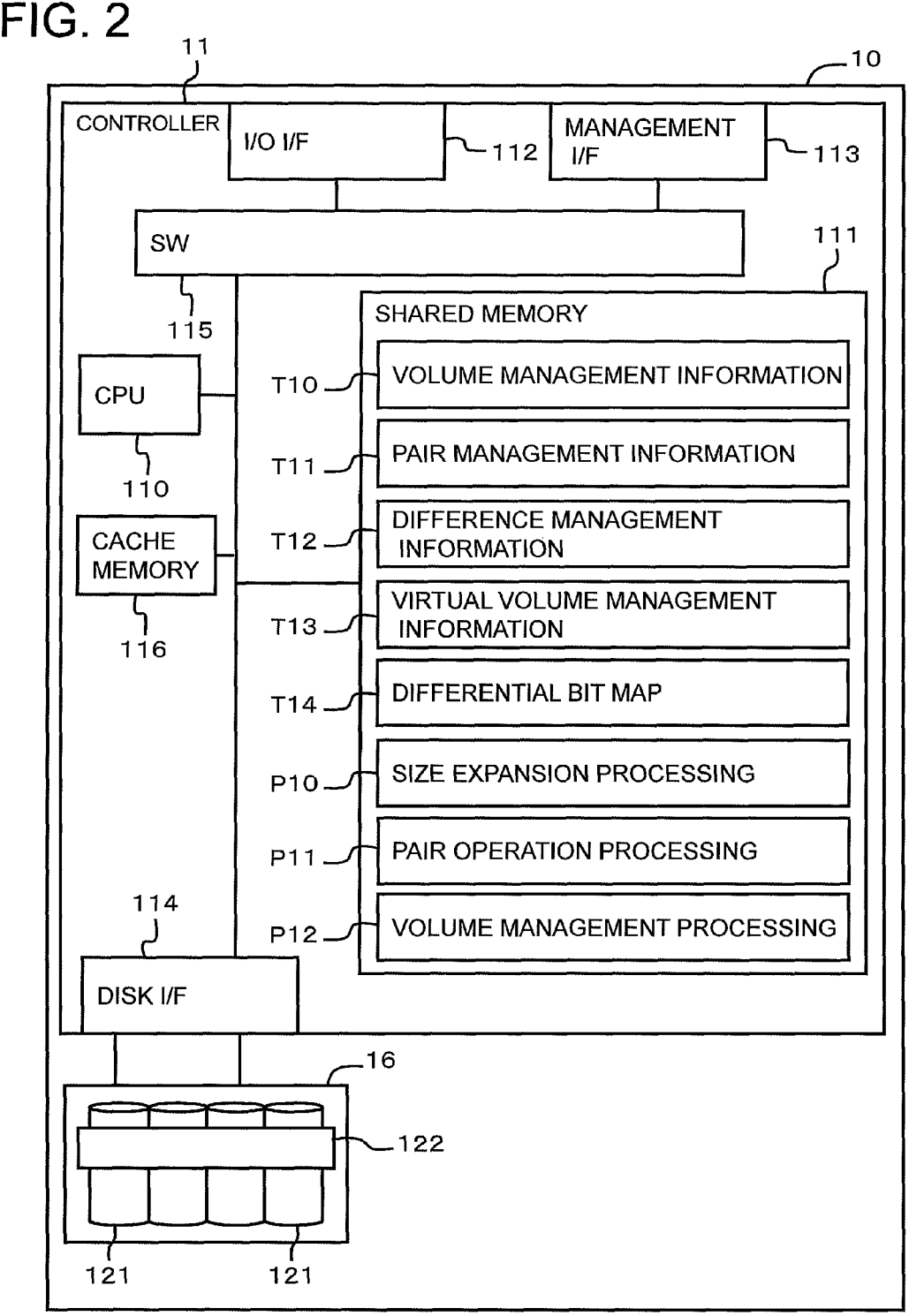
FIG. 2 shows a configuration of a storage apparatus 10.

FIG. 2 shows a configuration of the storage apparatus 10. The storage apparatus 10 includes the controller 11 and the storage device 16. The controller 11 controls the operation of the storage apparatus 10. The controller 11 includes a microprocessor 110, such as a central processing unit (CPU), a shared memory 111, an I/O interface 112, a management interface 113, a disk interface 114, a switch circuit 115 and a cache memory 116. In the drawing, "interface" is abbreviated as "I/F".

The microprocessor 110, the shared memory 111, the disk interface 114 and the cache memory 116 are interconnected by an internal bus. The I/O interface 112 and the management interface 113 are connected to the internal bus via the switch circuit 115.

The I/O interface 112 communicates with the server 20 or another storage apparatus 10 via the communication network CN2 or CN3. The management interface 113 communicates with the management server 30 via the communication network CN1. The disk interface 114 communicates with the storage device 16.

The storage device 16 includes a plurality of physical storage devices 121. The physical storage device 121 can be one of a variety of data readable/writable devices, such as a hard disk device, a semiconductor memory device, an optical disk device and a magneto-optical disk device.

When the hard disk device is used, a fibre channel (FC) disk, a small computer system interface (SCSI) disk, a SATA disk, an AT attachment (ATA) disk or a serial attached SCSI (SAS) disk can be used, for example. When the semiconductor memory device is used, a flash memory, a ferroelectric random access memory (FeRAM), a magnetoresistive random access memory (MRAM), an ovonic unified memory or a resistance RAM (PRAM (registered trademark)) can be used. Alternatively, different types of physical storage devices 121, such as flash memory devices and hard disk drives, may be used in combination.

The physical storage areas of the plurality of physical storage devices 121 can be integrated as a pool 122 for thin provisioning. One or more logical volumes can be created from the storage area of the pool 122. Alternatively, the physical storage areas may be integrated as a group of redundant arrays of inexpensive disks (a RAID group).

The cache memory 116 comprises one or more storage media, such as a random access memory (RAM), a read only memory (ROM), a flash memory device and a hard disk drive. The cache memory 116 stores data received from the server 20 or another storage apparatus 10 before the data is written to the storage device 16. The cache memory 116 also stores data read from the storage device 16 before the data is transmitted to the server 20 or another storage apparatus 10.

The shared memory 111 comprises one or more storage media, such as a random access memory (RAM), a read only memory (ROM), a flash memory device and a hard disk drive. The shared memory 111 stores a size expansion processing P10, a pair operation processing P11 and a volume management processing P12, which are computer programs. The shared memory 111 further stores volume management information T10, pair management information T11, difference management information T12 and virtual volume management information T13, which are management information. The microprocessor 110 reads computer programs from the shared memory 111 and executes the computer programs to achieve the functions described later. When the microprocessor 110 executes the computer programs, the microprocessor 110 can refer to the management information stored in the shared memory 111 as required.

The volume management information T10 is information used for managing the logical volumes provided by the storage apparatus 10. The pair management information T11 is information used for managing the copy pairs. The difference management information T12 is information used for managing differential data between two logical volumes forming a copy pair. A differential bit map T14 divides an address space of a logical volume into unit management areas of a predetermined size and sets for each unit management area a flag that indicates whether a difference occurs or not. The unit management area is a track, for example. The predetermined size is 256 Kbytes, for example. The virtual volume management information T13 is information used for managing a virtual volume generated by thin provisioning.

The volume management processing P12 is to manage the logical volumes.

The size expansion processing P10 is to expand the size of the logical volumes.

The pair operation processing P11 is to operate the state of the copy pair of the primary volume 13, which is a logical volume of a copy source, and the secondary volume 14, which is a logical volume of a copy destination. The state of the copy pair is a pair state, a suspend state, or a copy state, for example. The pair state is referred to also as a synchronous state.

The pair state is a state where the contents stored in the primary volume 13 and the secondary volume 14 are synchronized with each other. The data written to the primary volume 13 is also written to the secondary volume 14.

The suspend state is a state where the primary volume 13 and the secondary volume 14 are separated from each other, and the data in each volume is managed independently. In the suspend state, the data stored in the primary volume 13 and the data stored in the secondary volume 14 are not synchronized with each other. If the server 20 writes data to the primary volume 13 in the suspend state, differential data occurs between the primary volume 13 and the secondary volume 14. The differential data is managed with the differential bit map T14.

A resynchronization state is a state where the differential data between the primary volume 13 and the secondary volume 14 is written to the secondary volume 14. Once the resynchronization is completed, the copy pair enters into the pair state, where the data stored in the primary volume 13 and the data stored in the secondary volume 14 agree with each other.

A restoration state is a state where data is transferred from the secondary volume 14 to the primary volume 13, thereby making the data stored in the primary volume 13 agree with the data stored in the secondary volume 14. Once the restoration is completed, the copy pair enters into the pair state, where the data stored in the primary volume 13 and the data stored in the secondary volume 14 agree with each other.

Figure 3:
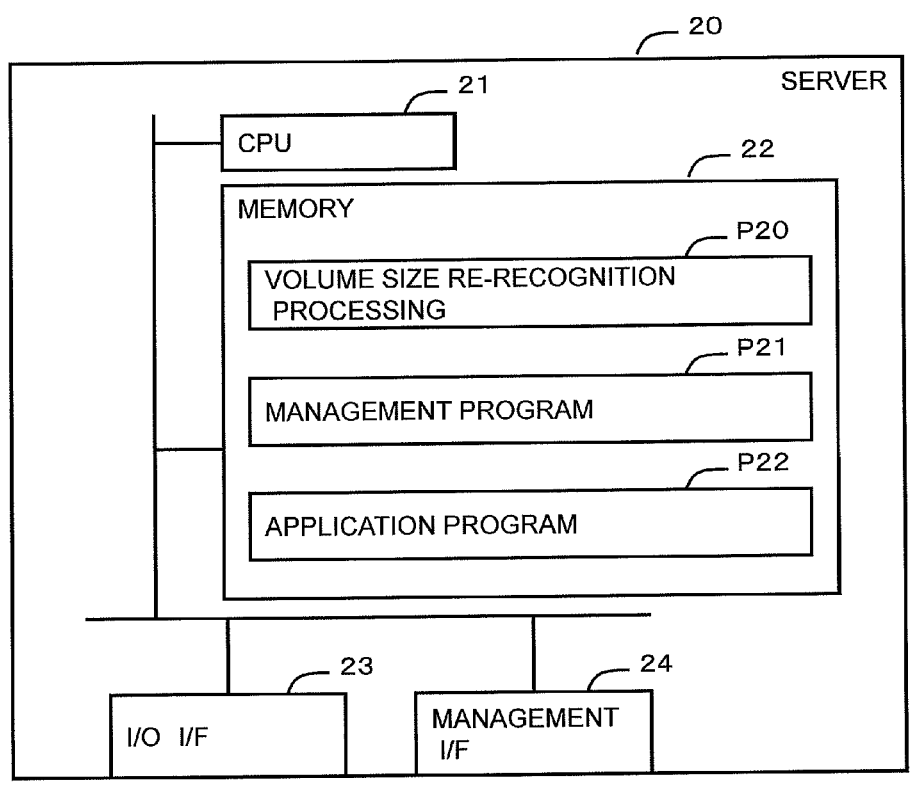
FIG. 3 shows a configuration of a server 20.

FIG. 3 shows a configuration of the server 20. The server 20 includes a microprocessor, such as a central processing unit (CPU) 21, a memory 22, an I/O interface 23 and a management interface 24, which are interconnected by an internal bus.

The microprocessor 21 reads computer programs from the memory 22 and executes the computer programs. The memory 22 includes one or more recording media, such as a RAM, a ROM, a flash memory device and a hard disk drive. The I/O interface 23 exchange data with another server 20 or the storage apparatus 10 via the communication network CN2 or CN3. The management interface 24 communicates with the management server 30 via the communication network CN1.

The memory 22 stores not only an operating system (not shown) but also a volume size re-recognition processing P20, which is a computer program for re-recognizing a volume size, a management program P21 and an application program P22. The volume size re-recognition processing P20 is invoked by an instruction from the management server 30 to stop the application program P22 and acquires the size of the logical volume used by the application program P22 from the storage apparatus 10. The volume size re-recognition processing P20 resumes the application program P22 after acquiring the volume size (after re-recognizing the volume size). The management program P21 is a program for managing a file, such as an operating system (OS) and a file system.

Figure 4:
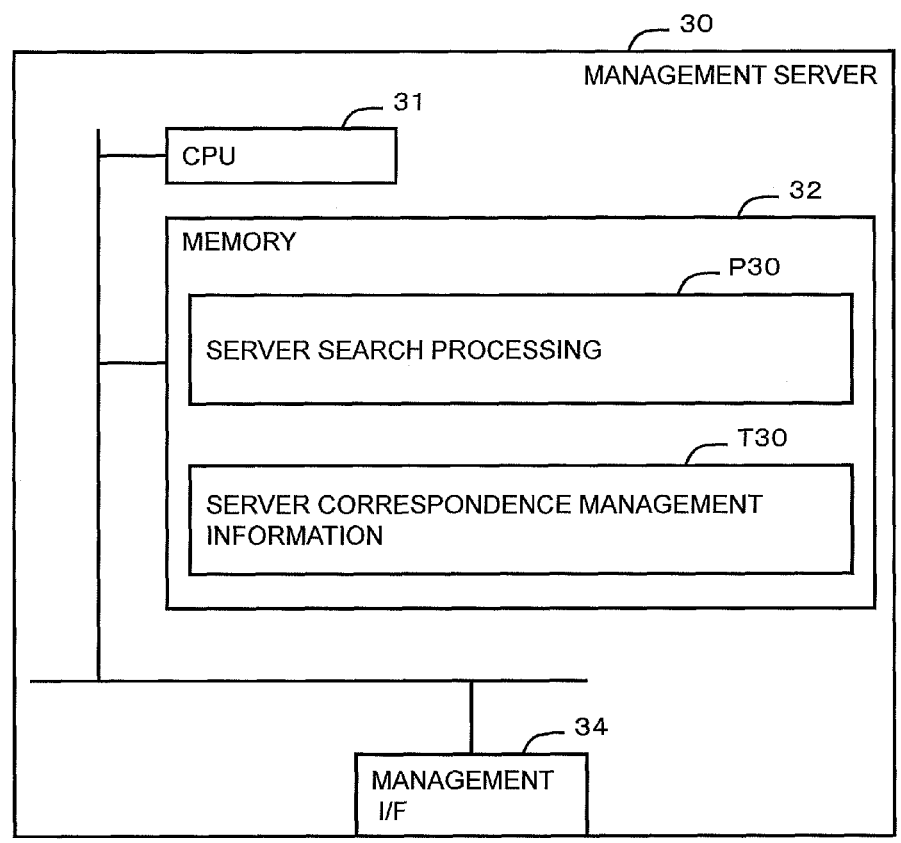
FIG. 4 shows a configuration of a management server 30.

FIG. 4 shows a configuration of the management server 30. The management server 30 includes a microprocessor 31, a memory 32 and an I/O interface 33, for example.

The microprocessor 31 reads a computer program from the memory 32 and executes the computer program. The memory 32 comprises one or more storage media, such as a RAM, a ROM, a flash memory device and a hard disk drive. A management interface 34 communicates with the server 20 via the communication network CN1.

The memory 32 stores not only an operating system and an application program (not shown) but also a server search processing 230, which is a computer program for searching the server 20, and a server correspondence management information T30 used for managing the correspondence between the servers 20 and the logical volumes.

Figure 5:
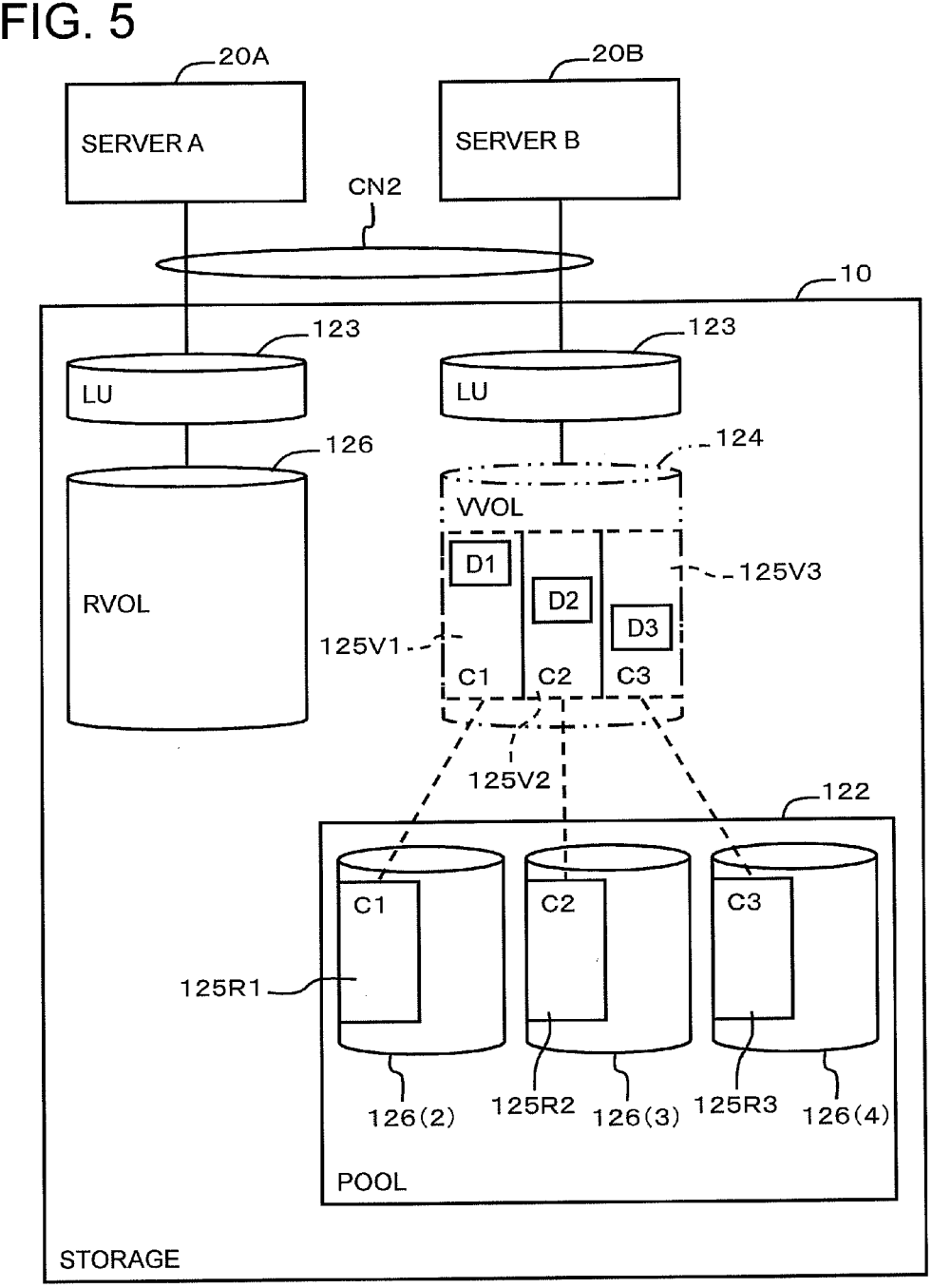
FIG. 5 is a schematic diagram showing a configuration of a logical volume.

FIG. 5 is a schematic diagram showing a configuration of logical volumes. A logical volume 123 provided to the server 20 may be a real volume 126 or a virtual volume 124. The real volume 126 is associated with a storage area in the physical storage device 121. The real volume 126 may be associated with one physical storage device 121 or a plurality of physical storage devices 121 forming a RAID group or the like. The virtual volume 124 is created by thin provisioning. The virtual volume is referred to also as a thin provisioning volume. In the drawing, the logical volume is denoted by LU, the virtual volume 124 is denoted by VVOL, and the real volume 126 is denoted by RVOL. The storage apparatus 10 in this embodiment uses the virtual volume 124 as the primary volume 13 and the secondary volume 14 and uses the real volume 126 as the journal volume 15. Alternatively, the virtual volume 124 may be used as the journal volume 15.

When the server 20 writes data to a virtual page 125V in the virtual volume 124, the volume management processing P12 selects a real page 125R for storing the data from the pool 122 and associates the real page 125R with the virtual volume 124. Another storage area of a different size in the virtual volume 124 may be used instead of the virtual page 125V. Another storage area of a different size in the pool 122 may be used instead of the real page 125R.

For example, when the server 20 writes data D1 to D3 to virtual pages 125V1 to 125V3 in the virtual volume 124, respectively, the volume management processing P12 selects real pages 125R1 to 125R3 from real volumes 126(2), 126(3) and 126(4) registered in the pool 122. Then, the volume management processing P12 allocates the real pages 125R1 to 125R3 to the virtual pages 125V1 to 125V3, respectively. In this way, the data D1 to D3 are stored in the real pages 125R1 to 125R3, respectively.

As described above, since the server 20B allocates the real page 125R to the virtual volume 124 by using thin provisioning, the real page 125R in the pool 122 can be efficiently used.

Management Information in Storage Apparatus 10

In the following, the management information in the storage apparatus 10 will be described.

FIG. 6 shows the volume management information T10. The volume management information T10 includes an entry for each logical volume. Each entry has a volume number field C100, a size field C101, a type field C102, a status field C103, an attribute field C104, a size change result field C105, a changed size field C106 and a size to reply to host computer field C107, for example. Other items of data can also be managed as the volume management information T10. A logical volume associated with a certain entry is referred to as a target logical volume herein.

The volume number field C100 indicates identification information used by the storage apparatus 10 to uniquely identify the target logical volume. In the drawing, the symbol "#" means "number". Other identification information, such as an identification code, may be used instead of the number.

The size field C101 indicates the size of the target logical volume (volume size).

The type field C102 indicates the type of the target logical volume. The values in the type field C102 include "normal" and "pool", for example. The "normal" indicates that the target logical volume is the virtual volume 124. The "pool" indicates that the target logical volume is a volume registered as the pool 122.

The attribute field C104 contains a value that indicates whether the target logical volume is in use or not. For example, if the target logical volume has been allocated to the server 20, or if the target logical volume has been used for expanding the size of another logical volume, the attribute field C104 indicates "allocated". If the target logical volume has not been allocated to the server 20 or another logical volume, the attribute field C104 indicates "unallocated".

The size change result field C105 contains a value that indicates whether a change of the volume size of the target logical volume has succeeded or failed. Changes of the volume size include expansion of the volume size and reduction of the volume size. If a change of the volume size has succeeded, the size change result field C105 indicates "success". If a change of the volume size has failed, the size change result field C105 indicates "failure". If no change of the volume size has occurred, the size change result field C105 indicates "-".

The changed size field C106 indicates the volume size after a size change. If no change of the volume size has occurred, or if a change of the volume size has failed, the value in the size field C101 and the value in the changed size field C106 agree with each other.

The size to reply to host computer field C107 indicates the volume size of which the server 20 is notified in reply to a size query.

FIG. 7 shows the pair management information T11. The pair management information T11 is information for managing copy pairs and includes an entry for each copy pair. Each entry has a pair number field C110, a primary volume number field C111, a secondary volume number field C112, a pair state field C113 and an expansion pair state field C114, for example. Other items of data can also be managed as the pair management information T11. A copy pair associated with a certain entry is referred to as a target copy pair herein.

The pair number field C110 indicates information for uniquely identifying the target copy pair. The primary volume number field C111 indicates information for identifying the primary volume 13 that is the copy source volume. The secondary volume number field C112 indicates information for identifying the secondary volume 14 that is the copy destination volume.

The pair state field C113 indicates the state of the target copy pair. Possible states of the copy pair include a pair state (PAIR), a suspend state (PSUS) and a copy state (COPY) during resynchronization. When the logical volumes forming the target copy pair are expanded, the area of each of the primary volume 13 and the secondary volume 14 yet to be expanded is referred to as an existing area, and the area thereof added by the expansion is referred to as an expansion area. Of the copy pairs, a copy pair of the existing area of the primary volume 13 and the existing area of the secondary volume 14 is referred to as an existing pair, and a copy pair of the expansion area of the primary volume 13 and the expansion area of the secondary volume 14 is referred to as an expansion pair. The pair state field C113 indicates the state of the existing pair. The controller 11 defines the existing pair when the copy pair is defined, and defines the expansion pair when the size of the primary volume 13 is expanded.

The expansion pair state field C114 indicates the state of the expansion pair. As with the existing pair, possible states of the expansion pair include a pair state, a suspend state and a copy state.

Figure 8:
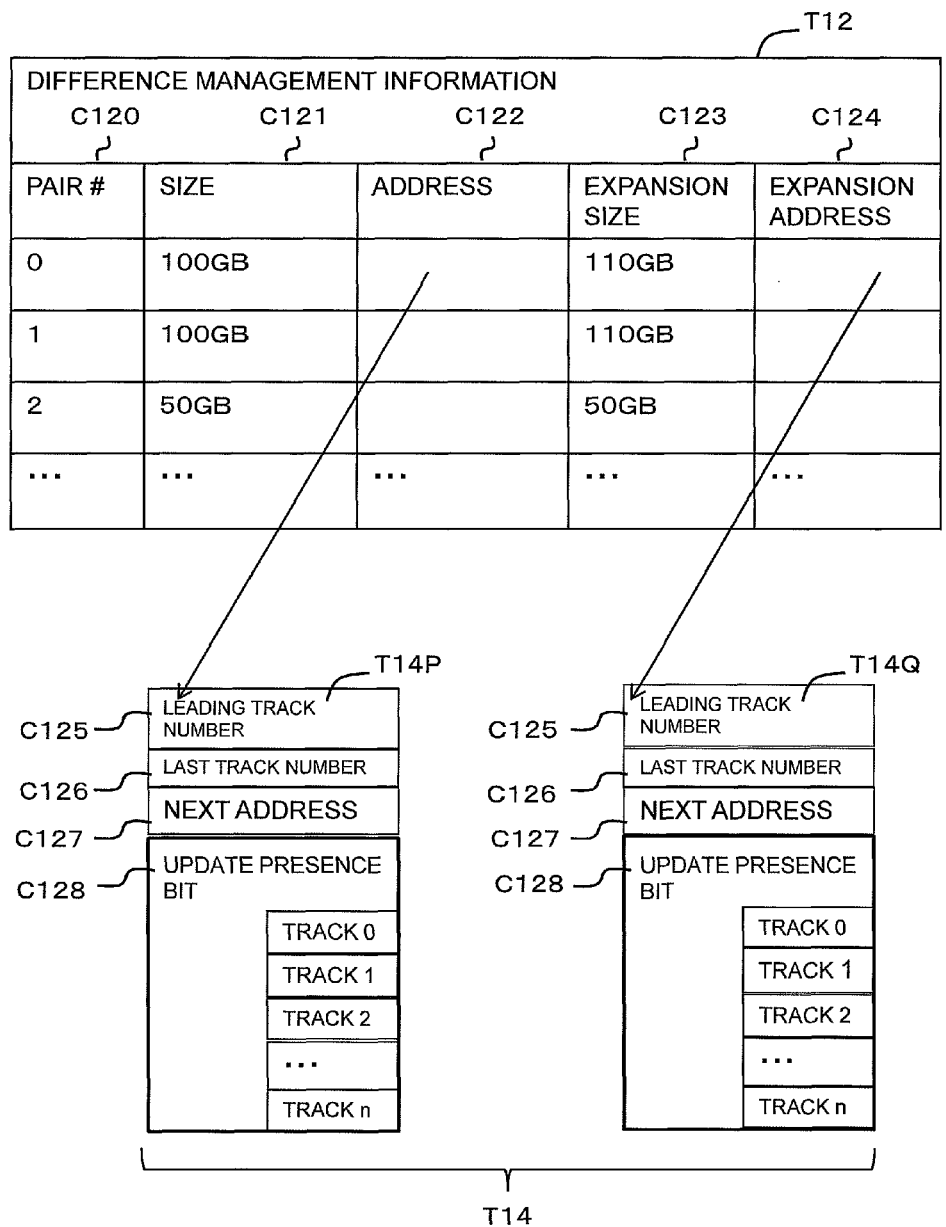
FIG. 8 shows a relationship between difference management information T12 and differential bit maps T14.

FIG. 8 shows a relationship between the difference management information T12 and differential bit maps T14. The difference management information T12 is information for managing the differential bit maps T14. The differential bit maps T14 include a differential bit map T14P that indicates an updated part of the existing area and a differential bit map T14Q that indicates an updated part of the expansion area. The difference management information T12 includes an entry for each copy pair. Each entry has a pair number field C120, a size field C121, an address field C122, an expansion size field C123 and an expansion address field C124, for example. Other items of information can also be managed as the difference management information T12. In this description, a copy pair associated with a certain entry is referred to as a target copy pair, and a logical volume of the target copy pair that is in the local housing is referred to as a target logical volume.

The pair number field C120 indicates information for uniquely identifying the target copy pair.

The size field C121 indicates the size of the existing area of the target logical volume. The address field C122 indicates a pointer to the address of the differential bit map T14P for the existing area of the target logical volume.

The expansion size field C123 indicates the changed size of the target logical volume, that is, the total size of the existing area and the expansion area. The expansion address field C124 indicates a pointer to the address of the differential bit map T14Q for the expansion area of the target logical volume.

The differential bit maps T14 manage the presence or absence of an update in units of tracks in the target logical volume. Each track number is associated with a logical address (logical block addressing, LBA) of the target logical volume. The differential bit map T14 has a leading track number field C125, a last track number field C126, a next address field C127 and an update presence bit field C128.

The leading track number field C125 indicates the number of the leading track in the target logical volume. The last track number field C126 indicates the number of the last track in the target logical volume. The next address field C127 indicates the address of the next differential bit map in the case where there is another differential bit map following the relevant differential bit map. For example, when the size of the secondary volume 14 is expanded so that the differential bit map T14P and the differential bit map T14Q are merged with each other, the next address field C127 of the differential bit map T149 indicates the address of the differential bit map T14Q. The update presence bit field C128 contains an update presence bit for each track. The update presence bit for a track indicates whether the track has been updated or not.

The next address field C127 of the differential bit map T14P for the existing area of the target logical volume indicates the address of the differential bit map T14Q for the expansion area of the target logical volume.

Figure 9:
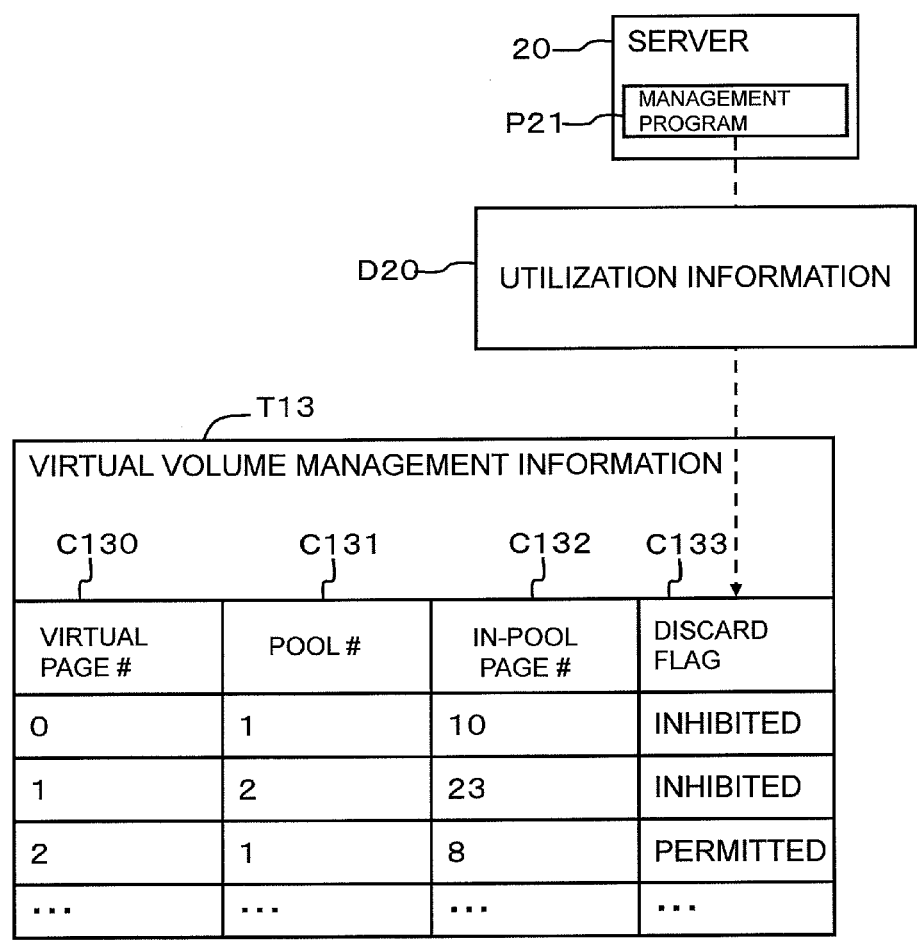
FIG. 9 shows virtual volume management information T13.

FIG. 9 shows the virtual volume management information T13. The virtual volume management information T13 includes an entry for each virtual page 125V. Each entry has a virtual page number field C130, a pool number field C131, an in-pool page number field C132 and a discard flag field C133, for example. A virtual page 125V associated with a certain entry is referred to as a target virtual page herein.

The virtual page number field C130 indicates information for identifying the target virtual page. The pool number field C131 indicates information for identifying one or more pools 122 that can be used by the target virtual page. Although the pool number field C131 in this example shows only one pool 122, the pool number field C131 can also show a plurality of pools 122. At least one real volume 126, typically a plurality of real volumes 126, is registered in the pool 122.

The in-pool page number field C132 indicates information for identifying the real page 125 allocated to the target virtual page.

The discard flag field C133 indicates a discard flag that indicates whether the page can be discarded or not, such as in the case where the page has gone out of use as a result of a defragmentation processing. If the discard flag field C133 indicates "permitted", the page can be discarded. If the discard flag field C133 indicates "inhibited", the page cannot be discarded.

The volume management processing P12 can grasp whether a particular virtual page 125V in the virtual volume 124 can be discarded or not, from utilization information D20 from the management program P21 in the server 20, for example. The utilization information D20 includes the utilization of a page by the management program P21 (such as identification information for identifying a page that is not in use), for example.

The storage apparatus 10 may detect whether the real page 125R can be discarded or not. The storage apparatus 10 may analyze the data of the real page 125R allocated to the virtual page and determine whether the real page 125R is in use or not. If the controller detects that the data stored in the real page has a particular pattern, the controller can determine that the real page can be discarded. The particular pattern is a pattern that the data stored in the real page are zero data, for example.

FIG. 10 shows the server correspondence management information T30. The server correspondence management information T30 includes an entry for each server 20. Each entry has a server ID field C300, a storage apparatus ID field C301 and a volume number field C302, for example. A server 20 associated with a certain entry is referred to as a target server herein.

The server ID field C300 indicates information for identifying the target server. The storage apparatus ID field C301 indicates information for identifying the storage apparatus 10 allocated to the target server. The volume number field C302 indicates information for identifying the logical volume allocated to the target server.

Specific Examples of Operations of Storage System 40

The storage system 40 performs a size expansion processing to expand the size of the logical volumes forming a copy pair.

In the following, several specific examples of operations in the size expansion processing will be described.

In this embodiment, the storage system 40 performs synchronous copy from the primary volume 13 to the secondary volume 14. In the synchronous copy, the storage apparatus 10A provided at a main site (primary site) is the copy source, and the storage apparatus 10B provided at a remote site (secondary site) B is the copy destination. The sites are data centers, for example.

When the storage system 40 expands the size of the logical volumes forming a copy pair, the storage system 40 expands the size of the primary volume 13 when the copy pair is in the pair state. Thus, the copy pair state of the existing pair is maintained to be the pair state, and the copy pair state of the expansion pair is changed to the suspend state. In the following, several specific examples of operations that occur after the primary volume 13 is expanded in the synchronous copy will be described.

In the following, an existing area update processing, which is a processing of updating the existing area, will be described.

Figure 11:
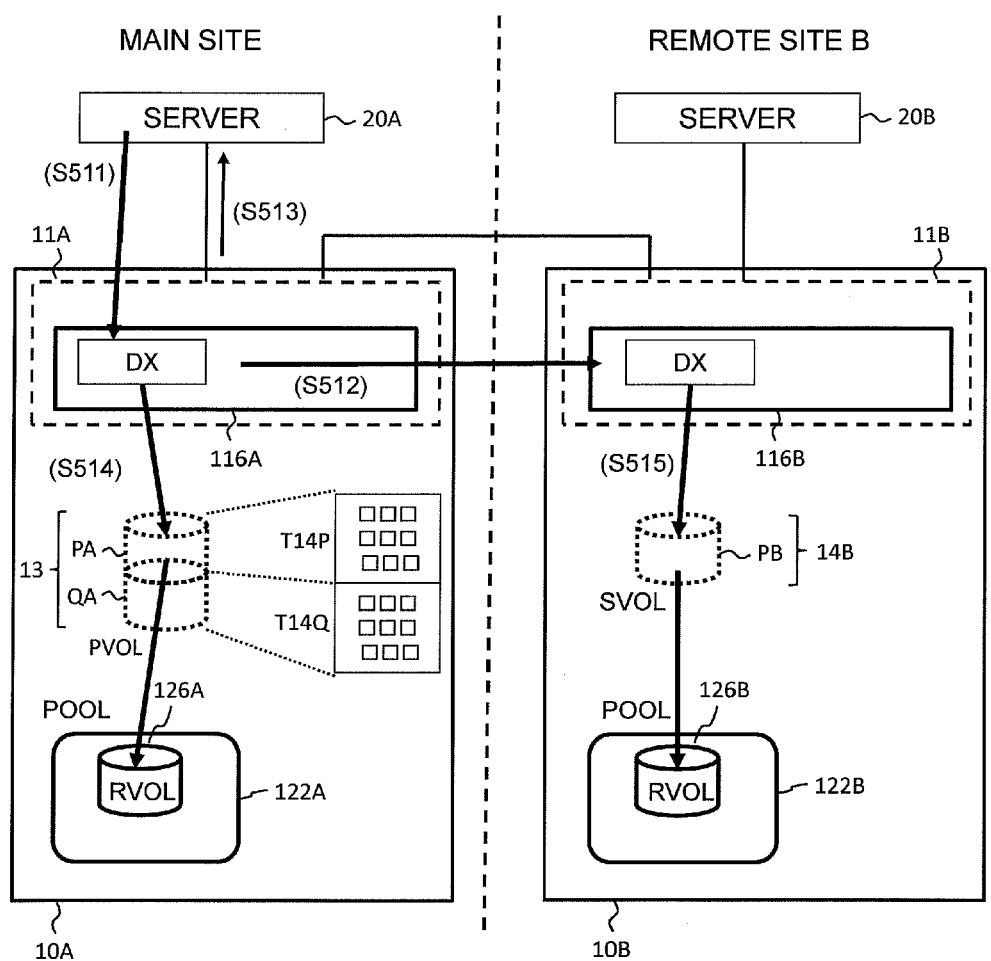
FIG. 11 is a schematic diagram showing an existing area update processing according to an embodiment 1.

FIG. 11 is a schematic diagram illustrating an existing area update processing according to the embodiment 1. This drawing shows a state where the controller 11A has added an expansion area QA to the primary volume 13 having an existing area PA. In this state, when the controller 11A in the storage apparatus 10A at the main site receives a write request from the server 20A, the controller 11A writes data DX to the cache memory 116A (S511). The write request specifies the existing area PA in the primary volume 13 as the destination of the data DX.

Then, the controller 11A transmits the data DX from the cache memory 116A to the storage apparatus 10B at the remote site B (S512). In response to this, the controller 11B in the storage apparatus 10B writes the received data DX to the cache memory 116B. Then, when the controller 11A completes the transmission, the controller 11A transmits a reply to the server 20A to notify the server 20A of the completion of the write operation (S513).

Then, the controller 11A destages the data DX from the cache memory 116A to the existing area PA in the primary volume 13 asynchronously with the transmission of the data DX (S514). In this way, the controller 11A writes the data DX to a real volume 126A in a pool 122A associated with the primary volume 13.

Besides, the controller 11B destages the data DX from the cache memory 116B to an existing area PB in the secondary volume 14B asynchronously with the transmission of the data DX (S515). In this way, the data DX is written to a real volume 126B in a pool 122B associated with the secondary volume 14B.

An existing area update processing has been described above. With this processing, the pair state of the existing pair can be maintained without expanding the secondary volume 14B. Consequently, the server 20 does not have to stop operating when expanding the size of the primary volume 13. In addition, the utilization of the real volume 126B can be reduced.

Next, an expansion area update processing, which is a processing of updating the expansion area, will be described.

Figure 12:
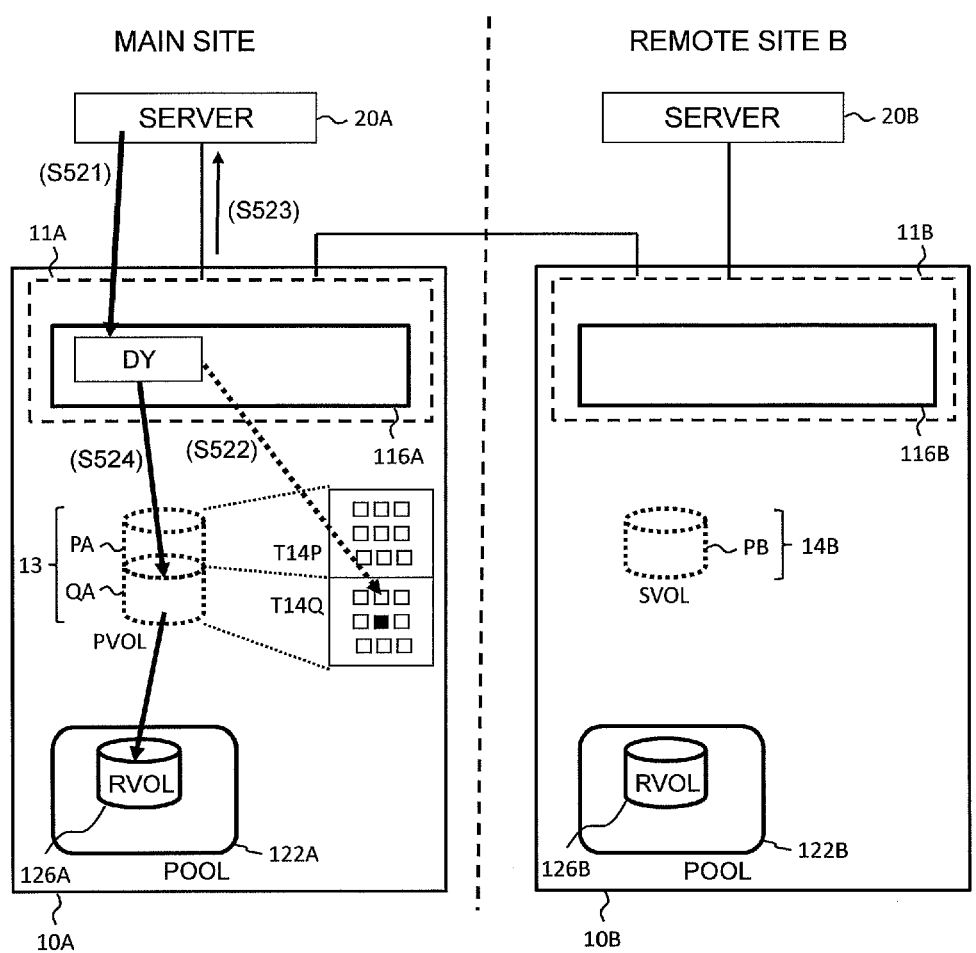
FIG. 12 is a schematic diagram showing an expansion area update processing according to the embodiment 1.

FIG. 12 is a schematic diagram illustrating an expansion area update processing according to the embodiment 1. First, when the controller 11A receives a write request from the server 20A, the controller 11A writes data DY to the cache memory 116A (S521). The write request specifies the expansion area QA in the primary volume 13 as the destination of the data DY.

The controller 11A includes the differential bit maps T14 for managing the primary volume 13. The differential bit maps T14 in this case include the differential bit map T14P for the existing area PA and the differential bit map T14Q for the expansion area QA. The controller 11A records the destination of the data DY in the differential bit map T14Q (S522). Then, the controller 11A transmits a reply to the server 20A to notify the server 20A of the completion of the write operation (S523).

Then, the controller 11A destages the data DY from the cache memory 116A to the expansion area QA in the primary volume 13 asynchronously with the recording to the differential bit map T14Q (S524). In this way, the data DY is written to the real volume 126A in the pool 122A associated with the primary volume 13.

An expansion area update processing has been described above. With this processing, the pair state of the existing pair can be maintained without expanding the secondary volume 14B. Consequently, the server 20 does not have to stop operating when expanding the size of the primary volume 13. In addition, the utilization of the real volume 126B can be reduced. In addition, the difference in the expansion pair can be managed.

Next, a difference update processing, which is a processing performed when the secondary volume 14B is expanded after the primary volume 13 is expanded, will be described.

Figure 13:
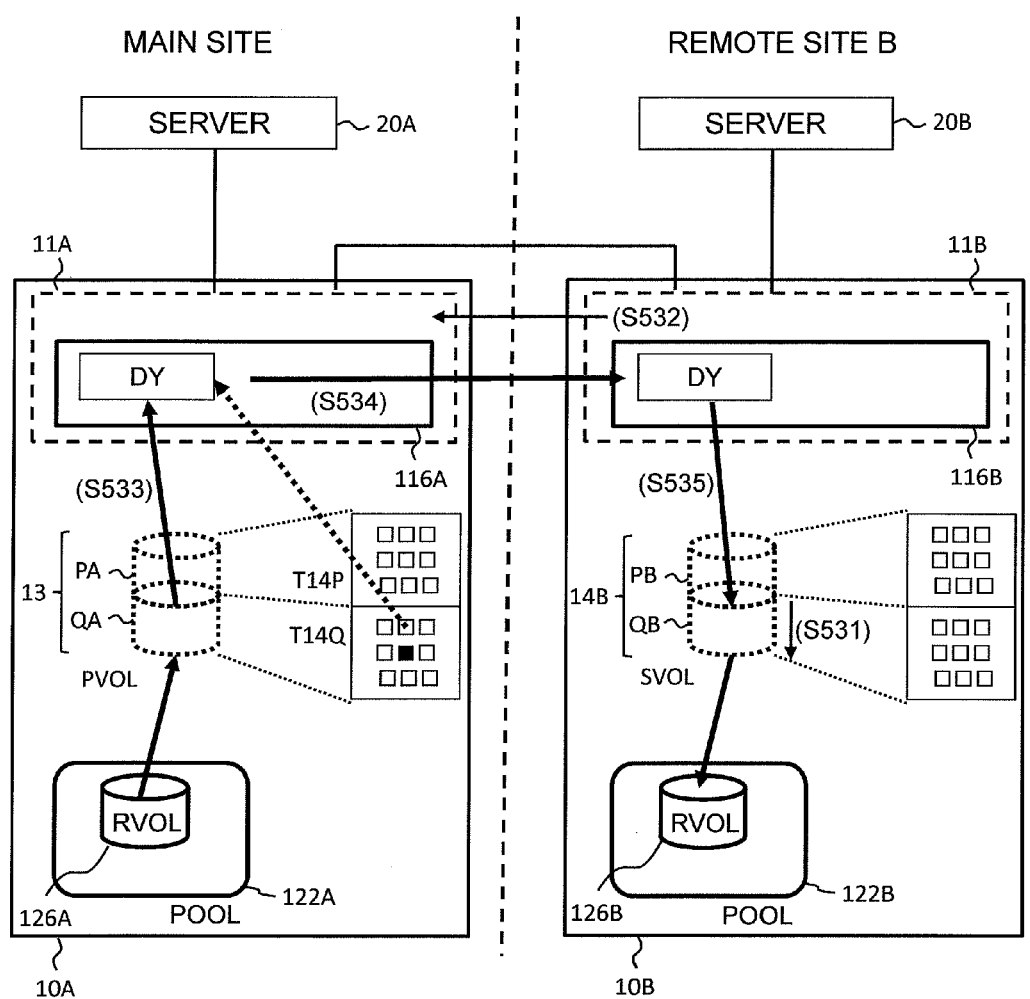
FIG. 13 is a schematic diagram showing a difference update processing according to the embodiment 1.

FIG. 13 is a schematic diagram illustrating a difference update processing according to the embodiment 1. First, the controller 11B expands the secondary volume 14B in response to an instruction from the management server 30 (S531). In this step, the controller 11B adds the expansion area QB to the secondary volume 14B. Then, the controller 11B transmits a notification to the controller 11A to notify the controller 11A of the expansion of the secondary volume 14B (S532).

Upon receiving the notification, the controller 11A stages the data DY from the primary volume 13 to the cache memory 116A based on the differential bit map T14Q for the expansion area QA in the controller 11A (S533). In this way, the controller 11A selects only the space for storing the data DY from the expansion area QA and reads the data DY into the cache memory 116A.

Then, the controller 11A transmits the data DY from the cache memory 116A to the storage apparatus 10B (S534). In response to this, the controller 11B writes the data to the cache memory 116B. Then, when the controller 11A completes the transmission, the expansion area QA of the primary volume 13 and the expansion area QA of the secondary volume 14B forming the expansion pair are resynchronized with each other, and the state of the expansion pair is changed from the suspend state to the pair state.

Then, the controller 11B destages the data DY from the cache memory 116B to the expansion area QB in the secondary volume 14B asynchronously with the transmission of the data DY (S535). In this way, the controller 11B writes the data DY to the real volume 126B in the pool 122B associated with the secondary volume 14.

A difference update processing has been described above. With this processing, the secondary volume 14B can be expanded at any time after the primary volume 13 is expanded, and the expanded primary volume 13 and the expanded secondary volume 14B forming the copy pair can be resynchronized with each other. In addition, since only the update data in the expansion area QA is transferred from the primary volume 13 to the secondary volume 14B after the secondary volume 14B is expanded, the time required for the resynchronization can be reduced.

Size Expansion Processing

In the following, a size expansion processing will be described.

In the size expansion processing, the storage apparatus 10A at the main site performs a primary volume expansion processing for expanding the primary volume 13 forming a copy pair, and the storage apparatus 10B at the remote site performs a secondary volume expansion processing for expanding the secondary volume 14 forming the copy pair.

In the following, the primary volume expansion processing will be described.

Figure 14:
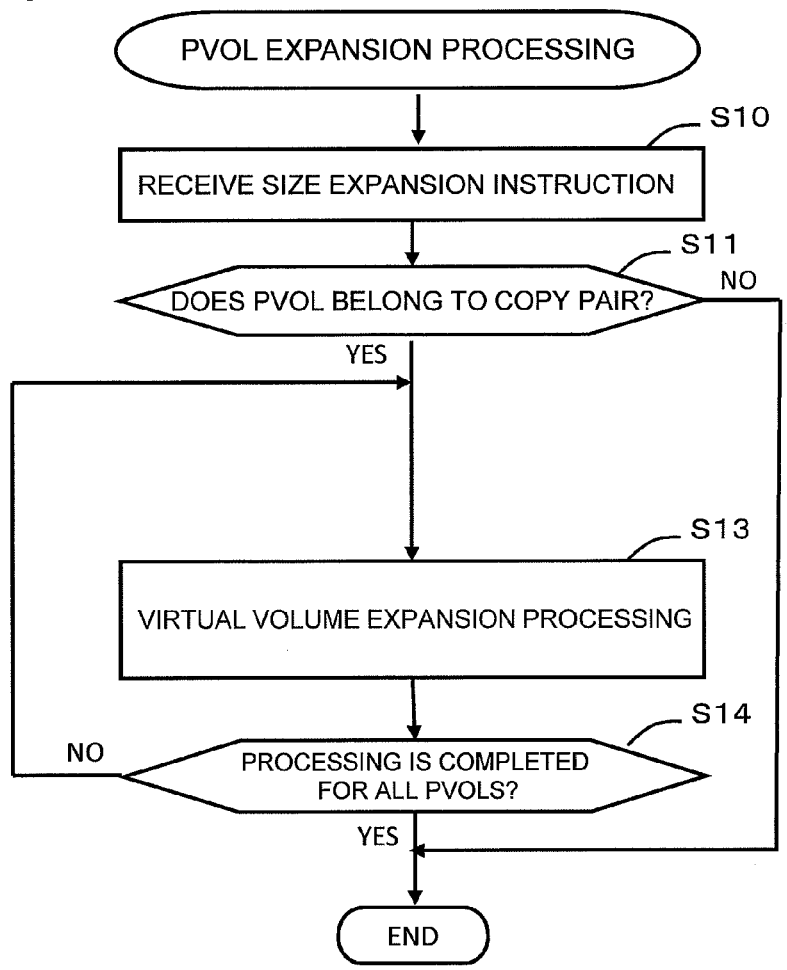
FIG. 14 is a flowchart showing a primary volume expansion processing.

FIG. 14 is a flowchart showing the primary volume expansion processing. The primary volume expansion processing is performed by the size expansion processing P10 in the controller 11A in the storage apparatus 10A at the main site.

First, the controller 11A receives a size expansion instruction for a primary volume 13 from the management server 30 (S10). The size expansion instruction specifies a primary volume 13 and the expanded size of the primary volume 13. Then, the controller 11A determines whether or not the primary volume 13 belongs to a copy pair (S11). For example, the controller 11A determines that the primary volume 13 belongs to a copy pair if the primary volume 13 is registered in the pair management information T11.

If it is determined that the primary volume 13 does not belong to a copy pair (if NO in S11), the controller 11A ends the flow.

If it is determined that the primary volume 13 belongs to a copy pair (if YES in S11), the controller 11A designates the primary volume 13 as a target volume and performs a virtual volume expansion processing described later (S13). Then, the controller 11A determines whether or not the virtual volume expansion processing is completed for all the primary volumes 13 specified by the size expansion instruction (S14).

If the virtual volume expansion processing is not completed for all the primary volumes 13 (if NO in S14), the controller 11A returns to S13 and performs the same processing for the next primary volume 13.

If the virtual volume expansion processing is completed for all the primary volumes 13 (if YES in S14), the controller 11A ends the flow.

A primary volume expansion processing has been described above. With this processing, the storage apparatus 10A including the primary volume 13 can perform the primary volume expansion processing that is not in synchronization with the secondary volume expansion processing. That is, the management server 30 can transmit the size expansion instruction for the primary volume 13 that is not in synchronization with a size expansion instruction for the secondary volume 14.

Next, the secondary volume expansion processing will be described.

Figure 15:
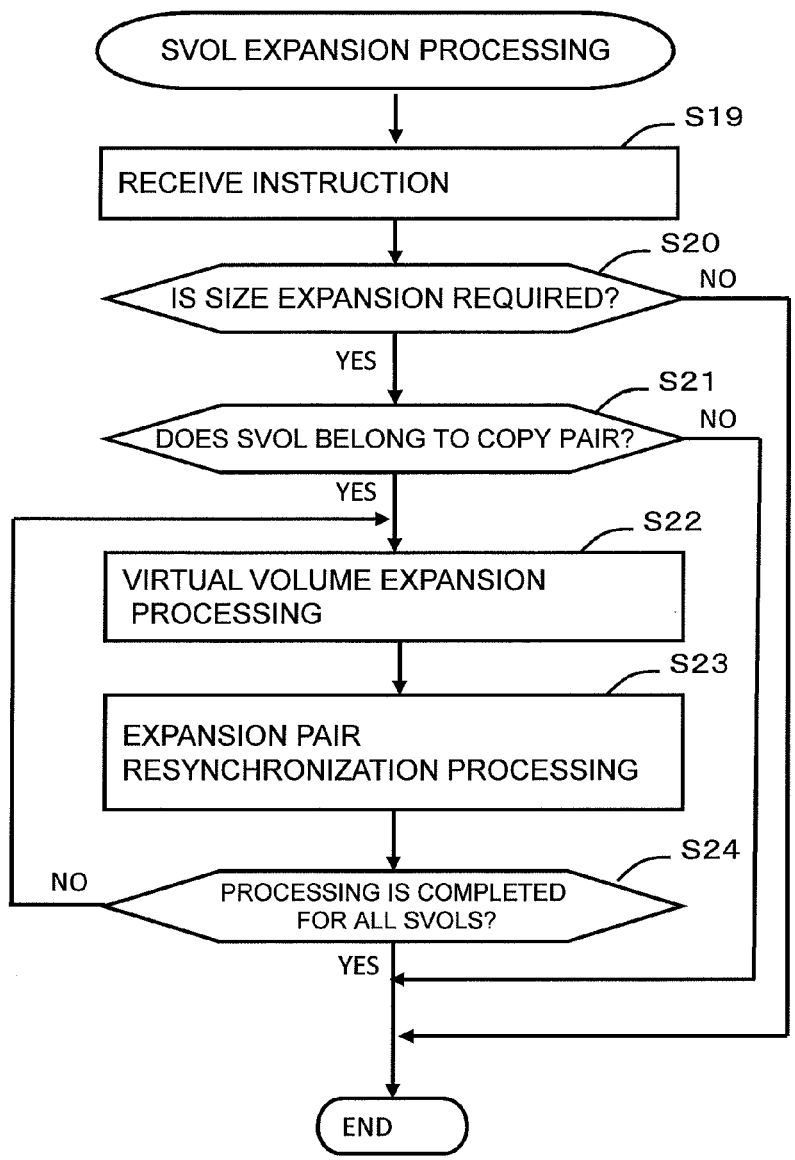
FIG. 15 is a flowchart showing a secondary volume expansion processing.

FIG. 15 is a flowchart showing the secondary volume expansion processing. The secondary volume expansion processing is performed by the size expansion processing P10 in the controller 11B. The secondary volume expansion processing corresponds to the difference update processing described above.

First, the controller 11B receives an instruction concerning a secondary volume 14 from the management server 30 (S19) and then determines whether expansion of the size of the secondary volume 14 is required or not (S20). If the received instruction is a size expansion instruction to expand the size of a secondary volume 14 or a secondary volume use instruction to use data in a secondary volume 14, the controller 11B determines that expansion of the size of the secondary volume 14 is required. The size expansion instruction specifies a secondary volume 14 and the expanded size of the secondary volume 14. The secondary volume use instruction is, for example, to instruct to back up data in a secondary volume 14 into another storage device, such as a tape device. Alternatively, the controller 11B may determine that expansion of the size of the secondary volume 14 is required if the received instruction is the size expansion instruction or the secondary volume use instruction, and the expansion area of the primary volume 13 is updated.

If it is determined that expansion of the size of the secondary volume 14 is not required (if NO in S20), the controller 11B ends the flow.

If it is determined that expansion of the size of the secondary volume 14 is required (if YES in S20), the controller 11B determines whether the secondary volume 14 belongs to a copy pair or not (S21). For example, the controller 11B determines that the secondary volume 14 belongs to a copy pair if the secondary volume 14 is registered in the pair management information T11.

If it is determined that the secondary volume 14 does not belong to a copy pair (if NO in S21), the controller 11B ends the flow.

If it is determined that the secondary volume 14 belongs to a copy pair (if YES in S21), the controller 11B proceeds to S22. In S22, the controller 11B designates the secondary volume 14 as a target volume and performs the virtual volume expansion processing described later (S22). Then, the controller 11B designates the copy pair to which the target volume belongs as a target copy pair and instructs the controller 11A of the copy source to perform an expansion pair resynchronization processing described later (S23). Then, the controller 11B determines whether or not the virtual volume expansion processing is completed for all the secondary volumes 14 specified by the size expansion instruction (S24).

If the virtual volume expansion processing is not completed for all the secondary volumes 14 (if NO in S24), the controller 11B returns to S22 and performs the same processing for the next secondary volume 14.

If the virtual volume expansion processing is completed for all the secondary volumes 14 (if YES in S24), the controller 11B ends the flow.

A secondary volume expansion processing has been described above. With this processing, the storage apparatus 10B including the secondary volume 14 can perform the secondary volume expansion processing that is not in synchronization with the primary volume expansion processing. That is, the management server 30 can transmit the size expansion instruction for the secondary volume 14 that is not in synchronization with the size expansion instruction for the primary volume 13.

Next, the virtual volume expansion processing performed in S13 and S22 described above will be described.

Figure 16:
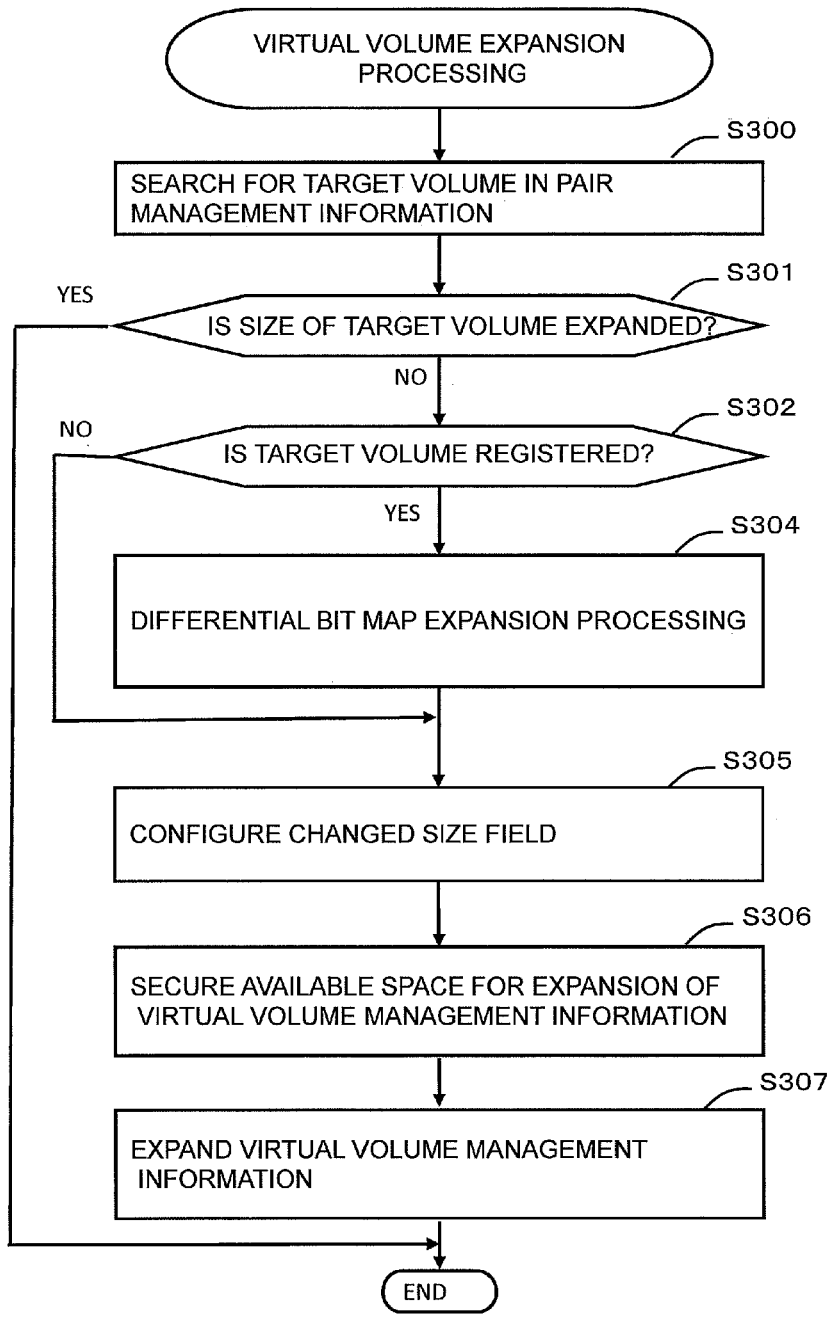
FIG. 16 is a flowchart showing a virtual volume expansion processing according to the embodiment 1.

FIG. 16 is a flowchart showing the virtual volume expansion processing according to the embodiment 1. First, the controller 11 searches for the target volume in the pair management information T11 (S300). Then, the controller 11 determines whether or not the size of the target volume has been expanded (S301). For example, the controller 11 determines that the size of the target volume has been expanded if the size change result field C105 for the target volume in the volume management information T10 indicates "success" or if the value in the size field C101 is equal to the value in the changed size field C106.

If it is determined that the size, of the target volume has been expanded (if YES in S301), the controller 11 ends the flow.

If it is determined that the size of the target volume is not expanded (if NO in S301), the controller 11 determines whether or not the target volume is registered in the pair management information T11 (S302). For example, the controller 11 determines that the target volume is registered in the pair management information T11 if the target volume is registered in the primary volume number field C111 or the secondary volume number field C112 in the pair management information T11. If it is determined that the target volume is not registered in the pair management information T11 (if NO in S302), the controller 11 proceeds to S305.

If it is determined that the target volume is registered in the pair management information T11 (if YES in S302), the controller 11 designates the copy pair corresponding to the target volume as a target copy pair based on the pair management information T11 and performs a differential bit map expansion processing described later (S304).

Then, the controller 11 configures the changed size field C106 for the target volume in the volume management information T10 (S305). In this step, the controller 11 writes the expanded size specified by the size expansion instruction to the changed size field C106. Then, the controller 11 secures, in the shared memory 111, an available space required for expansion of the virtual volume management information T13 (S306). Then, the controller 11 uses the secured available space to expand the virtual volume management information T13 (S307) and ends the flow. In this way, a new virtual page corresponding to the expansion area of the target volume is registered in the virtual volume management information T13.

A virtual volume expansion processing has been described above. With this processing, the differential bit map T14 and the virtual volume management information T13 can be expanded. In addition, since thin provisioning is used, and therefore, no real page has been allocated to the expansion area of the target volume when this processing is performed, the real pages in the pool 122 can be efficiently used. In addition, since thin provisioning is used, the controller 11 does not have to determine whether the size of the target volume can be expanded or not. The controller 11 may limit the expansion of the size of the target volume based on the remaining capacity of the pool 122 or the like. For example, the controller 11 may configure a threshold based on the remaining capacity of the pool 122 and avoid expanding the target volume if the increment of the size of the target volume exceeds the threshold.

Next, the differential bit map expansion processing performed in S302 described above will be described.

Figure 17:
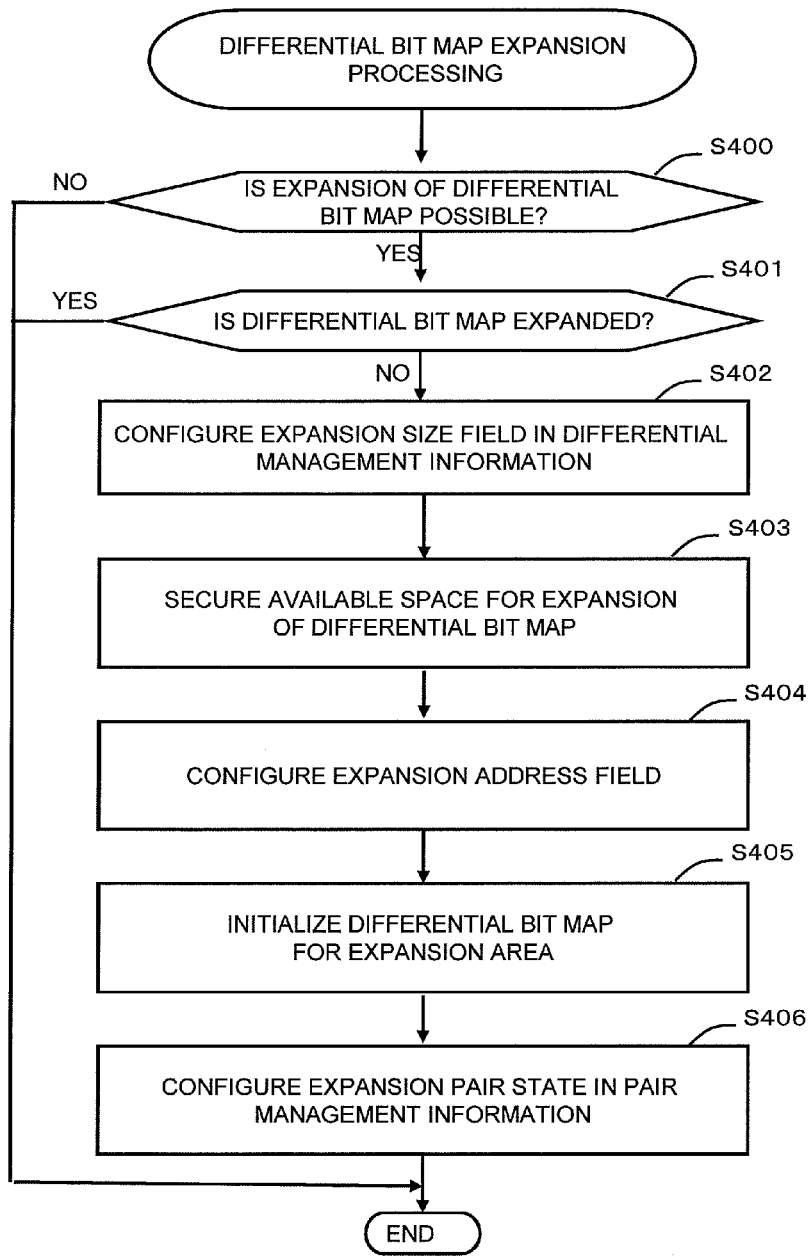
FIG. 17 is a flowchart showing a differential bit map expansion processing.

FIG. 17 is a flowchart showing the differential bit map expansion processing. First, the controller 11 determines whether the differential bit map T14 can be expanded or not (S400). For example, the controller 11 determines that the differential bit map T14 can be expanded if the increment of the size of the differential bit map T14 as a result of the expansion of the target volume is smaller than the size of the available space in the shared memory 111.

If it is determined that the differential bit map T14 cannot be expanded (if NO in S400), the controller 11 ends the flow. At this point in time, the controller 11 may terminate the size expansion processing and transmit an error reply to the server 20 that has transmitted the size expansion instruction.

If it is determined that the differential bit map T14 can be expanded (if YES in S400), the controller 11 determines whether the differential bit map T14 has been expanded or not (S401). For example, the controller 11 determines that the differential bit map T14 has been expanded if there is a pointer in the expansion address field C124 for the target copy pair in the difference management information T12.

If it is determined that the differential bit map T14 has been expanded (if YES in S401), the controller ends the flow.

If it is determined that the differential bit map T14 has not been expanded (if NO in S401), the controller 11 configures the expansion size field C123 for the target copy pair in the difference management information T12 (S402). In this step, the controller 11 writes the expanded size specified by the size expansion instruction to the expansion size field C123. Then, the controller 11 secures, in the shared memory 111, an available space for the differential bit map T14Q corresponding to the expansion area (S403). Then, the controller 11 configures the expansion address field C124 for the target copy pair in the difference management information T12 (S404). In this step, the controller 11 writes a pointer to the address of the secured space to the expansion address field C124. Then, the controller 11 initializes the differential bit map T14Q (S405). For example, the controller 11 writes 0 to all the update presence bits in the differential bit map T14Q. In this way, the differential bit map T14Q indicates that there is no updated data (difference) in the expansion area. Then, the controller 11 configures the expansion pair state field C114 for the target copy pair in the pair management information T11 (S406) and ends the flow. In this step, the controller 11 writes the suspend state (PSUS) to the expansion pair state field C114.

A differential bit map expansion processing has been described above. With this processing, in addition to the existing pair, the differential bit map and the copy pair state for the expansion pair can be managed. Consequently, the existing pair and the expansion pair can be resynchronized at any time while maintaining the pair state of the existing pair.

Next, an update processing in the case where the storage apparatus 10A at the main site receives a write request for the primary volume 13 from the server 20 will be described.

Figure 18:
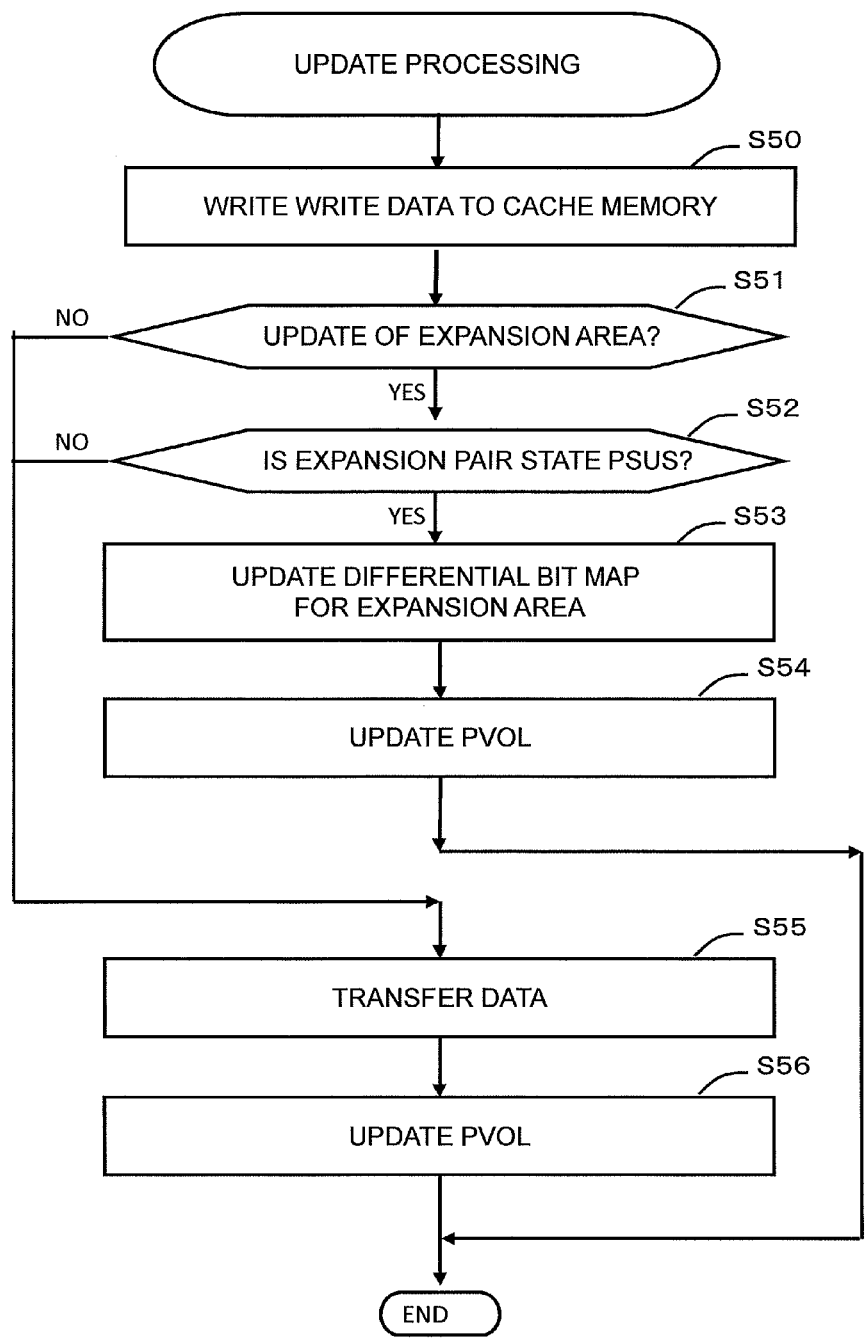
FIG. 18 is a flowchart showing an update processing according to the embodiment 1.

FIG. 18 is a flowchart showing the update processing according to the embodiment 1. The write request specifies a logical address in a primary volume 13 and involves write data. The controller 11A writes the received write data to the cache memory 116A (S50). Then, the controller 11A determines whether or not the write request is to update the expansion area of the primary volume 13 (S51). For example, the controller 11A determines that the write request is to update the expansion area if the address specified by the write request is in the expansion area. In this step, the controller 11A recognizes the primary volume 13 corresponding to the address specified by the write request and recognizes the target copy pair, which is the copy pair to which the primary volume 13 belongs, based on the pair management information T11. In addition, the controller 11A determines the address range of the expansion area from the leading track number field C125 and the last track number field C126 in the differential bit map T14Q shown in the expansion address field C124 for the target copy pair in the difference management information T12, and determines whether or not the address specified by the write request is in the expansion area.

If it is determined that the write request is to update the existing area (if NO in S51), the controller 11A transmits the data from the cache memory 116A to the storage apparatus 10B of the copy destination (S55). In response to this, the controller 11B in the storage apparatus 10B updates the secondary volume 14 with the write data. In this step, the controller 11B receives the write data, writes the write data to the cache memory 116B and writes the write data from the cache memory 116B to the existing area of the secondary volume 14.

Then, the controller 11A updates the existing area of the primary volume 13 with the write data (S56) and ends the flow. In this step, the controller 11A writes the write data from the cache memory 116A to the address specified by the write request. The steps S55 to S56 described above correspond to the existing area update processing described above.

If it is determined that the write request is to update the expansion area (if YES in S51), the controller 11A determines whether or not the expansion pair of the target copy pair is in the suspend state (S52). For example, the controller 11A determines that the expansion pair of the target copy pair is in the suspend state if the expansion pair state field C114 for the target copy pair in the pair management information T11 indicates the suspend state (PSUS).

If it is determined that the expansion pair is not in the suspend state (if NO in S52), the controller 11A proceeds to S54. For example, the expansion pair is not in the suspend state when the expansion pair is in the copy state or the pair state.

If it is determined that the expansion pair is in the suspend state (if YES in S52), the controller 11A updates the differential bit map T14Q for the expansion area of the primary volume 13 (S53). For example, the controller 11A changes the update presence bit for the track specified by the write request in the differential bit map T14Q to 1. Then, the controller 11A updates the expansion area of the primary volume 13 with the write data and ends the flow. In this step, the controller 11A writes the write data from the cache memory 116A to the address specified by the write request. The steps S53 to S54 described above correspond to the expansion area update processing described above.

An update processing has been described above. With this processing, the pair state of the existing pair can be maintained by performing the normal pair state update processing if the target of the write request is the existing area and updating the primary volume 13 if the target of the write request is the expansion area.

Next, the expansion pair resynchronization processing performed in S23 described above will be described.

Figure 19:
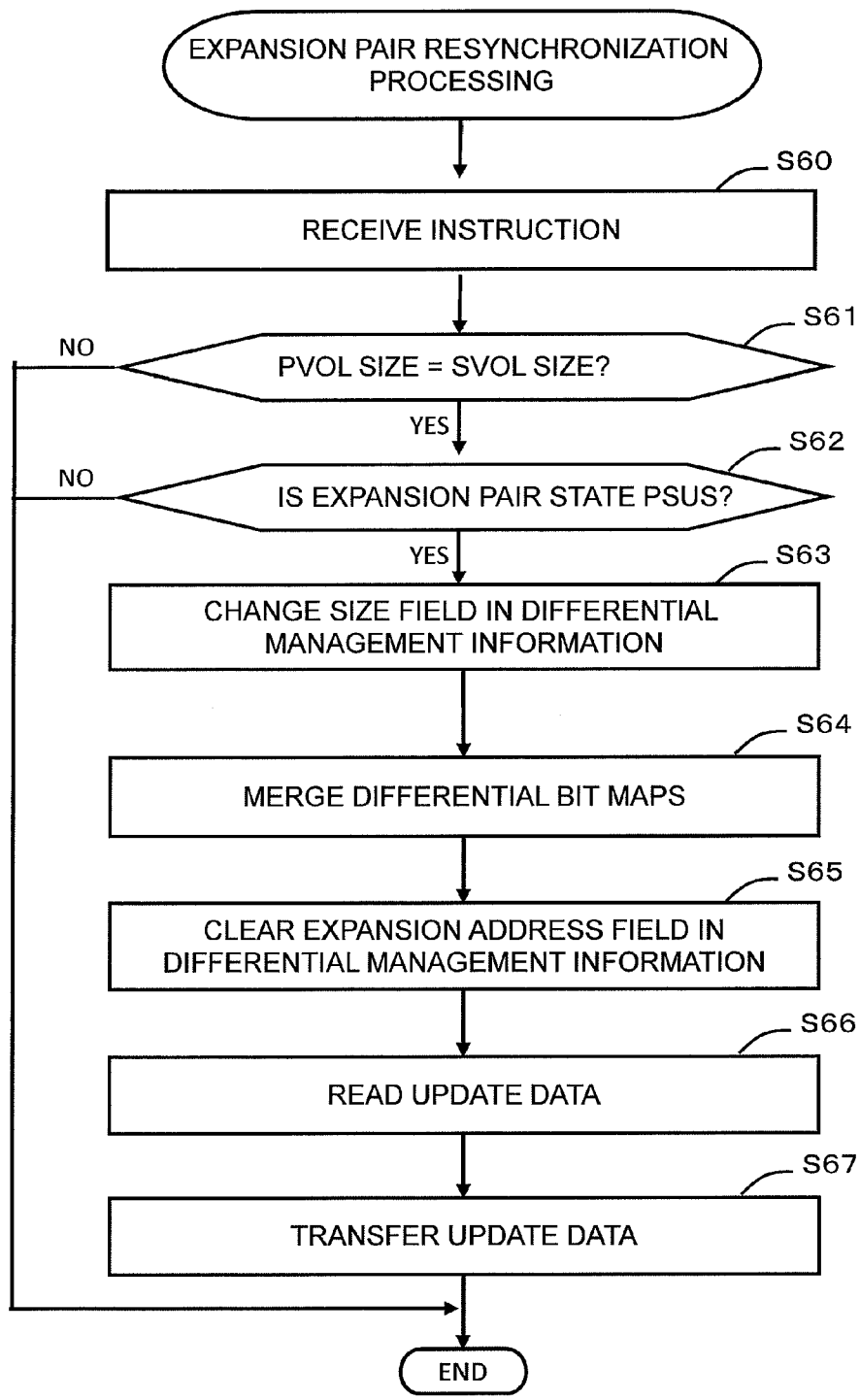
FIG. 19 is a flowchart showing an expansion pair resynchronization processing according to the embodiment 1.

FIG. 19 is a flowchart showing the expansion pair resynchronization processing according to the embodiment 1. This processing is performed in response to the controller 11A of the copy source receiving an instruction from the controller 11B of the copy destination. A copy pair specified by the controller 11B is referred to as a target copy pair herein.

First, the controller 11A receives an instruction to perform the expansion pair resynchronization processing from the secondary volume expansion processing (S60) and then determines whether or not the size of the primary volume 13 is equal to the size of the secondary volume 14 (S61).

If it is determined that the size of the primary volume 13 is not equal to the size of the secondary volume 14 (if NO in S61), the controller 11A ends the flow.

If it is determined that the size of the primary volume 13 is equal to the size of the secondary volume 14 (if YES in S61), the controller 11A determines whether or not the expansion pair state of the target copy pair is the suspend state (PSUS) (S62). In this step, the controller 11A refers to the expansion pair state field C114 for the target copy pair in the pair management information T11.

If it is determined that the expansion pair state is not the suspend state (if NO in S62), the controller 11A ends the flow.

If it is determined that the expansion pair state is the suspend state (if YES in S62), the controller 11A changes the value in the size field C121 for the target copy pair in the difference management information T12 to the value in the expansion size field C123 (S63). Then, the controller 11A writes the value in the expansion address field C124 for the target copy pair to the next address field C127 in the differential bit map T14P for the existing pair, thereby merging the differential bit map T14Q for the expansion pair with the differential bit map T14P for the existing pair (S64). Then, the controller 11A clears the expansion address field C124 for the target copy pair in the difference management information T12 (S65). Then, the controller 11A reads update data from the expansion area into the cache memory 116A based on the differential bit map T14Q (S66). Then, the controller 11A transmits the read update data to the storage apparatus 10B of the copy destination (S67) and ends the flow. In response to this, the controller 11B in the storage apparatus 10B receives the update data, writes the update data to the cache memory 116B and writes the update data from the cache memory 116B to the expansion area of the secondary volume 14.

An expansion pair resynchronization processing has been described. With this processing, after the expansion pair is resynchronized, the differential bit map for the existing pair and the differential bit map for the expansion pair of the target copy pair can be managed as one differential bit map, and the target copy pair can be brought into the pair state. In addition, since only the update data in the expansion area is written to the secondary volume 14, the time required for resynchronization can be reduced.

In the period before the primary volume expansion processing, the pair management information T11 manages the state of the existing area in the pair state field C113. Then, in the period between the primary volume expansion processing and the secondary volume expansion processing, the pair management information T11 manages the state of the existing area in the pair state field C113 and the state of the expansion area in the expansion pair state field C114. Then, in the period after the secondary volume expansion processing, the pair management information T11 manages the state of the total of the existing area and the expansion area in the pair state field C113 and does not use the expansion pair state field C114.

In the case where a second size expansion processing is performed after a first size expansion processing, in the second size expansion processing, the total of the existing area and the expansion area resulting from the first size expansion processing is managed as a new existing area, and a new expansion area is created. In this case, the pair management information T11 manages the state of the new expansion area in the expansion pair state field C114. In this way, after the size of the logical volume forming the copy pair is expanded, the size of the logical volume can be further expanded.

Next, the size expansion processing performed by the management server 30 will be described.

Figure 20:
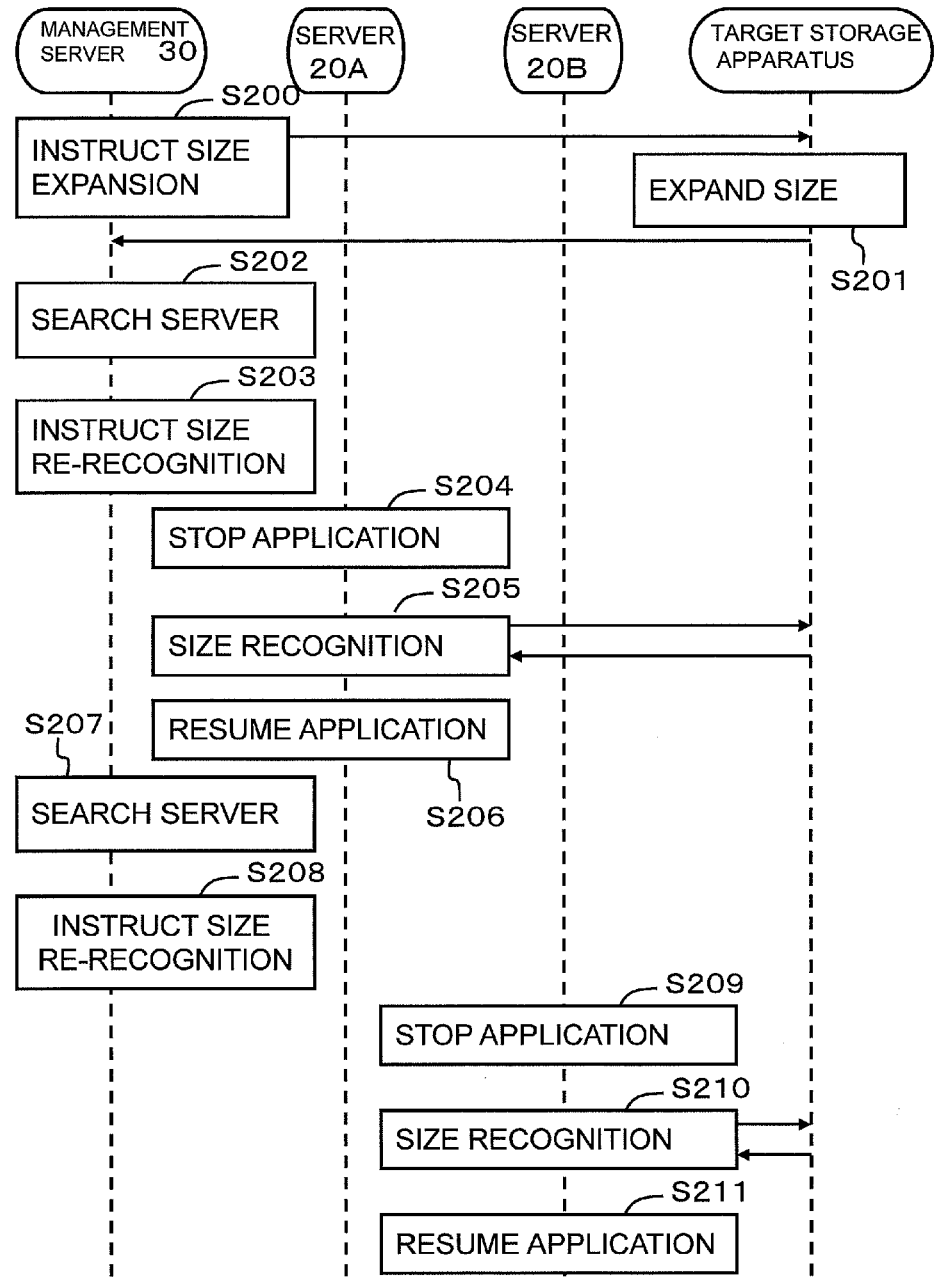
FIG. 20 is a sequence diagram showing a size expansion processing.

FIG. 20 is a sequence diagram showing the size expansion processing. The primary volume 13 or the secondary volume 14 expanded in the size expansion processing is referred to as a target volume herein. For the sake of convenience, the storage apparatus 10 of the copy source or the storage apparatus 10 of the copy destination that includes the target volume is referred to as a target storage apparatus.

The management server 30 transmits an instruction for a volume expansion processing to the target storage apparatus (S200). The volume expansion processing is the primary volume expansion processing or the secondary volume expansion processing described above. The instruction specifies the target volume. The target storage apparatus performs the volume expansion process according to the instruction (S201).

When the management server 30 confirms that the volume expansion processing for the target storage apparatus is completed, the management server 30 refers to the server correspondence management information T30 to search for the server 20A that is using the target volume with the expanded volume size (S202). The management server 30 instructs the server 20A using the target volume to re-recognize the volume size (S203).

Upon receiving the re-recognition instruction from the management server 30, the server 20A stops the application program P22 (S204) and issues a command to inquire about the volume size to the target storage apparatus (S205).

The target storage apparatus replies by notifying the server 20A of the size of the target volume used by the server 20A. Upon being notified of the volume size by the target storage apparatus, the server 20A resumes the operation of the application program P22 (S206).

The management server 30 refers to the server correspondence management information T30 again to search for the other server 20B that is using the target volume with the expanded volume size (S207). The management server 30 instructs the server 20B using the target volume to re-recognize the volume size (S208).

Upon receiving the re-recognition instruction, the server 20B stops the application program P22 (S209) and issues a command to inquire about the volume size to the target storage apparatus (S210).

The storage apparatus 10 replies by notifying the server 20B of the size of the target volume used by the server 20B. Upon being notified of the volume size by the storage apparatus 10, the server 20B resumes the operation of the application program P22 (S211).

A size expansion processing has been described above. With this processing, the server 20 that is using the target volume can recognize the size of the target volume in synchronization with expansion of the volume size of the target volume.

Embodiment 2

In an embodiment 2, the storage system 40 using asynchronous copy will be described.

The configuration of the computer system is the same as that according to the embodiment 1.

Specific Examples of Operations of Storage System 40

In this embodiment, the storage system 40 performs asynchronous copy from the primary volume 13 to the secondary volume 14C. In the asynchronous copy, the storage apparatus 10A provided at the main site is the copy source, and the storage apparatus 10C provided at a remote site C is the copy destination.

When the storage system 40 expands the size of the logical volumes forming a copy pair, the size of the primary volume 13 is first expanded. This allows the copy pair state to be maintained to be the pair state. That is, when the size of the primary volume 13 is expanded, the existing pair is maintained in the pair state, while the expansion pair is brought into the pair state.

In the following, several specific examples of operations performed after the primary volume 13 is expanded will be described.

Here, an existing area update processing, which is a processing of updating the existing area, will be described.

Figure 21:
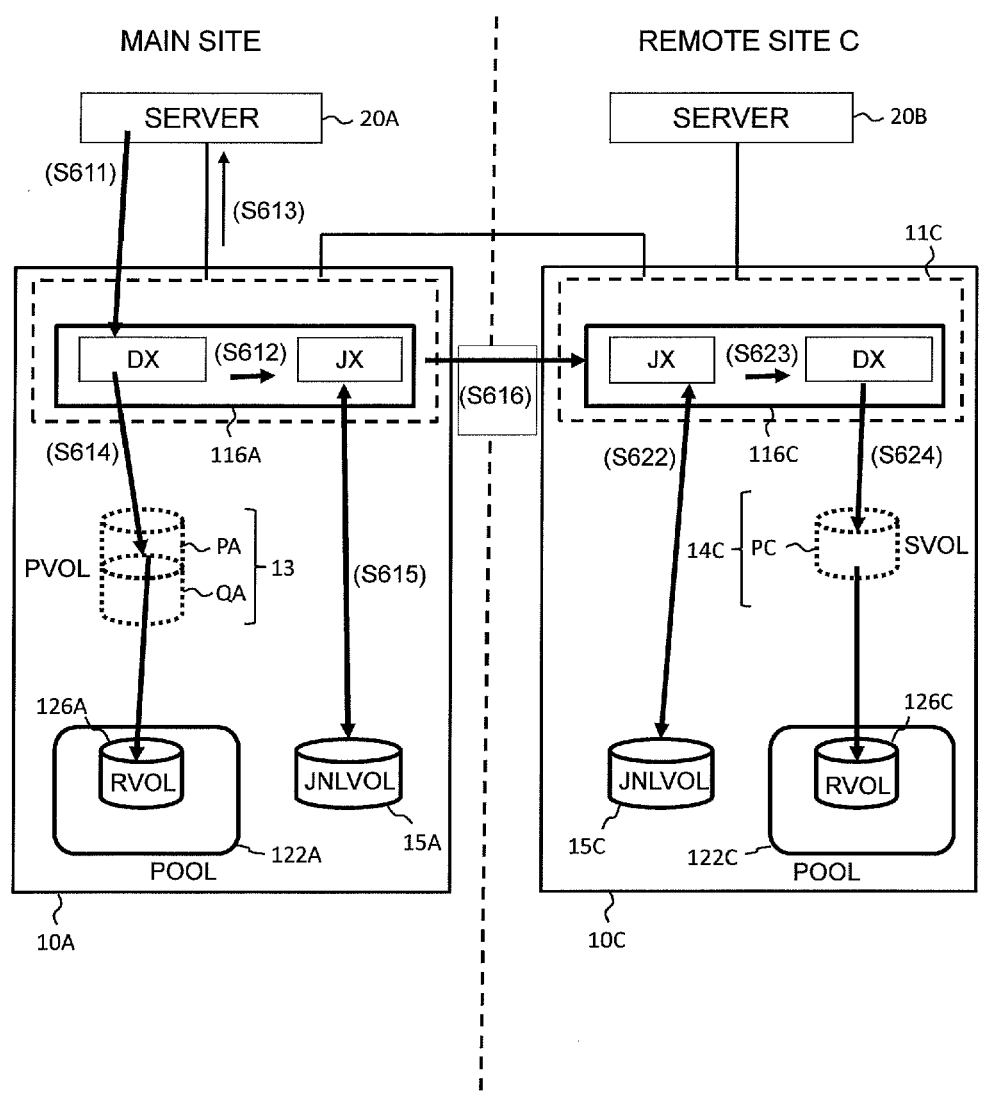
FIG. 21 is a schematic diagram showing an existing area update processing according to an embodiment 2.

FIG. 21 is a schematic diagram illustrating an existing area update processing according to the embodiment 2. This drawing shows a state where the controller 11A has added the expansion area QA to the primary volume 13 having the existing area PA. In this state, when the controller 11A in the storage apparatus 10A at the main site receives a write request from the server 20A, the controller 11A writes the data DX to the cache memory 116A (S611). The write request specifies the existing area PA in the primary volume 13 as the destination of the data DX.

Then, the controller 11A creates journal data JX from the data DX in the cache memory 116A and writes the journal data JX to the cache memory 116A (S612). The journal data indicates a history of updates by write requests. Then, the controller 11A transmits a reply to the server 20A to notify the server 20A of the completion of the write operation (S613).

Then, the controller 11A destages the data DX from the cache memory 116A to the existing area PA in the primary volume 13 asynchronously with the creation of the journal data JX (S614). In this way, the controller 11A writes the data DX to the real volume 126A in the pool 122A associated with the primary volume 13.

Besides, the controller 11A destages the journal data JX from the cache memory 116A to the journal volume 15A asynchronously with the destaging of the data DX (S615). In this way, the journal data JX is written to the journal volume 15A.

Besides, the controller 11C in the storage apparatus 10C reads the journal data JX from the storage apparatus 10A asynchronously with the destaging of the journal data JX, and the controller 11A transmits the journal data JX from the cache memory 116A to the storage apparatus 10C at the remote site C (S616). In response to this, the controller 11C in the storage apparatus 10C writes the received journal data JX to the cache memory 116C.

Then, the controller 11C destages the journal data JX from the cache memory 116C to the journal volume 15C (S622). In this way, the controller 11C writes the journal data JX to the journal volume 15C.

Besides, the controller 11C determines whether or not the journal data JX updates the existing area. If it is determined that the existing area is to be updated, the controller 11C normalizes the data DX based on the journal data JX asynchronously with the destaging of the journal data JX (S623). In this way, the controller 11C creates the data DX from the journal data JX and writes the data DX to the cache memory 116C.

Then, the controller 11C destages the data DX from the cache memory 116C to an existing area PC in the secondary volume 14C (S624). In this way, the controller 11C writes the normalized data DX to a real volume 126C in a pool 122C associated with the secondary volume 14C.

An existing area update processing has been described above. With this processing, the pair state of the copy pair can be maintained without expanding the secondary volume 14C. Consequently, the server 20 does not have to stop operating. In addition, the utilization of the real volume 126C can be reduced.

Next, an expansion area update processing, which is a processing of updating the expansion area, will be described.

Figure 22:
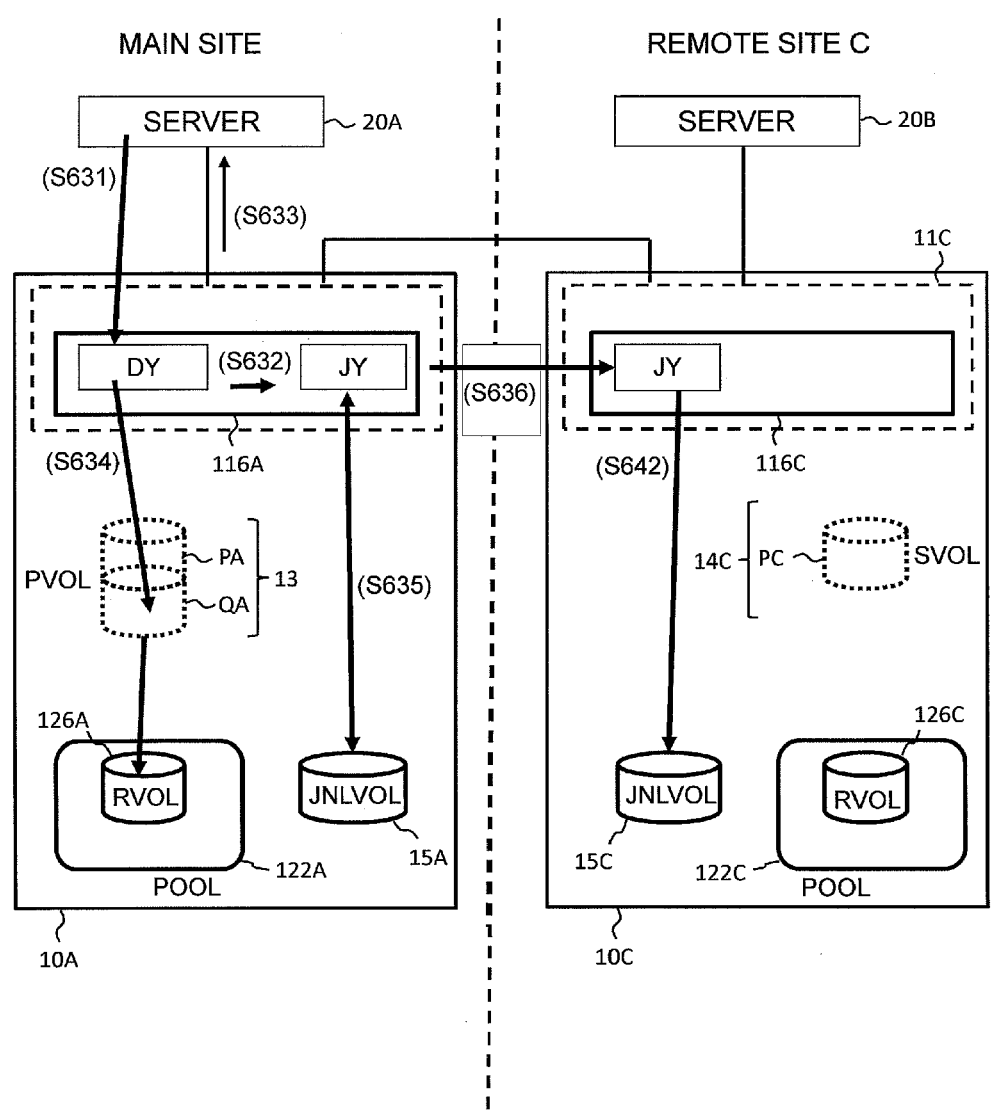
FIG. 22 is a schematic diagram showing an expansion area update processing according to the embodiment 2.

FIG. 22 is a schematic diagram illustrating an expansion area update processing according to the embodiment 2. First, when the controller 11A receives a write request from the server 20A, the controller 11A writes the data DY to the cache memory 116A (S631). The write request specifies the expansion area QA in the primary volume 13 as the destination of the data DY.

Then, the controller 11A creates journal data JY from the data DY in the cache memory 116A and writes the journal data JY to the cache memory 116A (S632). Then, the controller 11A transmits a reply to the server 20A to notify the server 20A of the completion of the write operation (S633).

Then, the controller 11A destages the data DY from the cache memory 116A to the expansion area QA in the primary volume 13 asynchronously with the creation of the journal data JY (S634). In this way, the controller 11A writes the data DY to the real volume 126A in the pool 122A associated with the primary volume 13.

Besides, the controller 11A destages the journal data JY from the cache memory 116A to the journal volume 15A asynchronously with the destaging of the data DY (S635). In this way, the journal data JY is written to the journal volume 15A.

Besides, the controller 11C in the storage apparatus 10C reads the journal data JY from the storage apparatus 10A asynchronously with the destaging of the journal data JY, and the controller 11A transmits the journal data JY from the cache memory 116A to the storage apparatus 10C (S636). In response to this, the controller 11C in the storage apparatus 10C writes the received journal data JY to the cache memory 116C.

Then, the controller 11C destages the journal data JY from the cache memory 116C to the journal volume 15C (S642). In this way, the controller 11C writes the journal data JY to the journal volume 15C. Then, the controller 11C determines whether or not the journal data JY updates the existing area. If it is determined that the existing area is not to be updated, the controller 11C does not normalize the data DY.

An expansion area update processing has been described above. With this processing, the pair state of the existing pair can be maintained without expanding the secondary volume 14C. Consequently, the server 20 does not have to stop operating when expanding the size of the primary volume 13. In addition, the utilization of the real volume 126C can be reduced. In addition, since when the expansion area is updated, the journal data indicating the update is transferred from the main site to the remote site C, if a failure occurs at the main site, the data can be restored from the remote site C.

Next, a difference update processing, which is a processing performed when the secondary volume 14C is expanded after the primary volume 13 is expanded, will be described.

Figure 23:
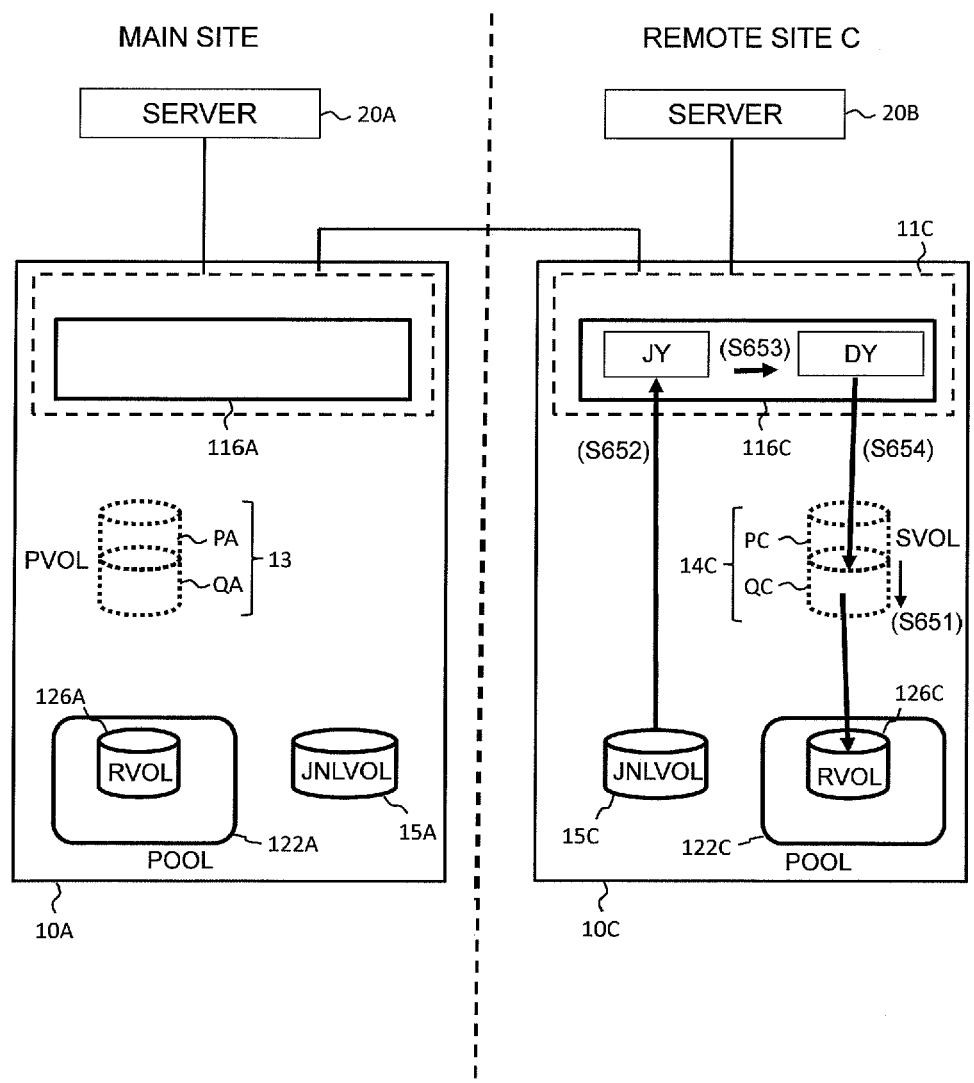
FIG. 23 is a schematic diagram showing a difference update processing according to the embodiment 2.

FIG. 23 is a schematic diagram illustrating a difference update processing according to the embodiment 2. First, the controller 11C expands the secondary volume 14C in response to an instruction from the management server 30 (S651). In this step, the controller 11C adds an expansion area QC to the secondary volume 14C.

Then, the controller 11C restores the journal data JY from the journal volume 15C into the cache memory 116C (S652). In this way, the controller 11C writes the journal data JY to the cache memory 116C.

Then, the controller 11C normalizes the data DY based on the restored journal data JX (S653). In this way, the controller 11C creates the data DY from the journal data JY and writes the data DY to the cache memory 116C.

Then, the controller 11C destages the data DY from the cache memory 116C to the expansion area QC in the secondary volume 14C (S654). In this way, the controller 11C writes the normalized data DY to the real volume 126C in the pool 122C associated with the secondary volume 14C.

A difference update processing has been described above. With this processing, the secondary volume 14C can be expanded at any time after the primary volume 13 is expanded, and the data in the expanded secondary volume 14C can be made to comply with the data in the expanded primary volume 13. In addition, since only the data in the expansion area QA is normalized after the secondary volume 14C is expanded, the burden on the controller 11C can be reduced.

Size Expansion Processing

In the following, a size expansion processing will be described.

The primary volume expansion processing and the secondary volume expansion processing are the same as those according to the embodiment 1. According to this embodiment, the secondary volume expansion processing can be performed without being synchronized with the primary volume expansion processing. That is, the management server 30 can transmit the size expansion instruction for the secondary volume 14 that is not in synchronization with the size expansion instruction for the primary volume 13.

Here, the virtual volume expansion processing performed in S13 and S22 described above will be described.

The virtual volume expansion processing according to this embodiment is the same as that according to the embodiment 1.

According to this virtual volume expansion processing, since a virtual volume created by thin provisioning is used, and therefore, no real page has not been allocated to the expansion area of the target volume when this processing is performed, the real pages in the pool 122 can be efficiently used. In addition, the difference management using the differential bit map is unnecessary.

Next, an update processing in the case where the storage apparatus 10A at the main site receives a write request for the primary volume 13 from the server 20 will be described.

Figure 24:
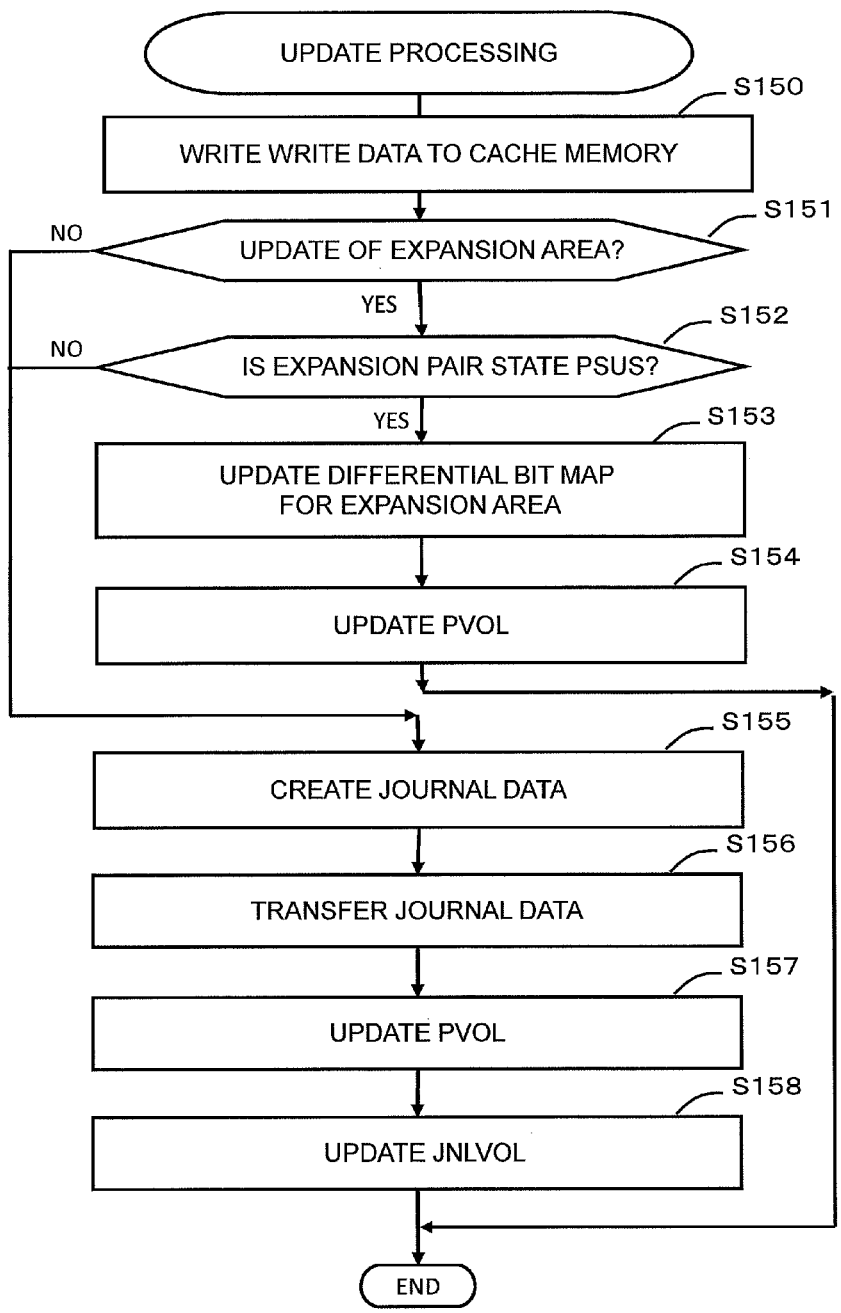
FIG. 24 is a flowchart showing an update processing according to the embodiment 2.

FIG. 24 is a flowchart showing the update processing according to the embodiment 2. The controller 11A writes the received write data to the cache memory 116A (S150). Then, the controller 11A determines whether or not the write request is to update the expansion area of the primary volume 13 (S151).

If it is determined that the write request is to update the existing area (if NO in S151), the controller 11A creates journal data from the write data and writes the journal data to the cache memory 116 (S155) and transmits the journal data from the cache memory 116 to the storage apparatus 10C of the copy destination (S156). In response to this, the controller 11C in the storage apparatus 10C receives the journal data, writes the journal data to the cache memory 116C and writes the journal data from the cache memory 116C to the journal volume 15C. In addition, the controller 11C normalizes update data based on the journal data to create update data, writes the created update data to the cache memory 116C, and writes the created update data from the cache memory 116C to the existing area in the secondary volume 14.

Then, the controller 11A updates the existing area in the primary volume 13 with the write data (S157). In this step, the controller 11A writes the write data form the cache memory 116A to the address specified by the write request.

Then, the controller 11A updates the journal volume 15A with the journal data (S158) and ends the flow. In this step, the controller 11A writes the journal data from the cache memory 116A to the journal volume 15A. The steps S155 to S158 correspond to the existing area update processing described above.

If it is determined that the write request is to update the expansion area (if YES in S151), the controller 11A determines whether or not the expansion pair of the target copy pair is in the suspend state (S152). For example, the controller 11A determines that the expansion pair of the target copy pair is in the suspend state if the expansion pair state field C114 for the target copy pair in the pair management information T11 indicates the suspend state (PSUS).

If it is determined that the expansion pair is not in the suspend state (if NO in S152), the controller 11A proceeds to S155. For example, the expansion pair is not in the suspend state when the expansion pair is in the copy state or the pair state.

If it is determined that the expansion pair is in the suspend state (if YES in S152), the controller 11A updates the differential bit map T14Q for the expansion area of the primary volume 13 (S153). For example, the controller 11A changes the update presence bit for the track specified by the write request in the differential bit map T14Q to 1. Then, the controller 11A updates the expansion area of the primary volume 13 with the write data and ends the flow. In this step, the controller 11A writes the write data from the cache memory 116A to the address specified by the write request. The steps S152 to S154 described above correspond to the expansion area update processing described above.

An update processing has been described above. With this processing, the pair state of the copy pair can be maintained even when the size of the logical volumes is expanded.

Next, the expansion pair resynchronization processing performed in S23 described above will be described.

Figure 25:
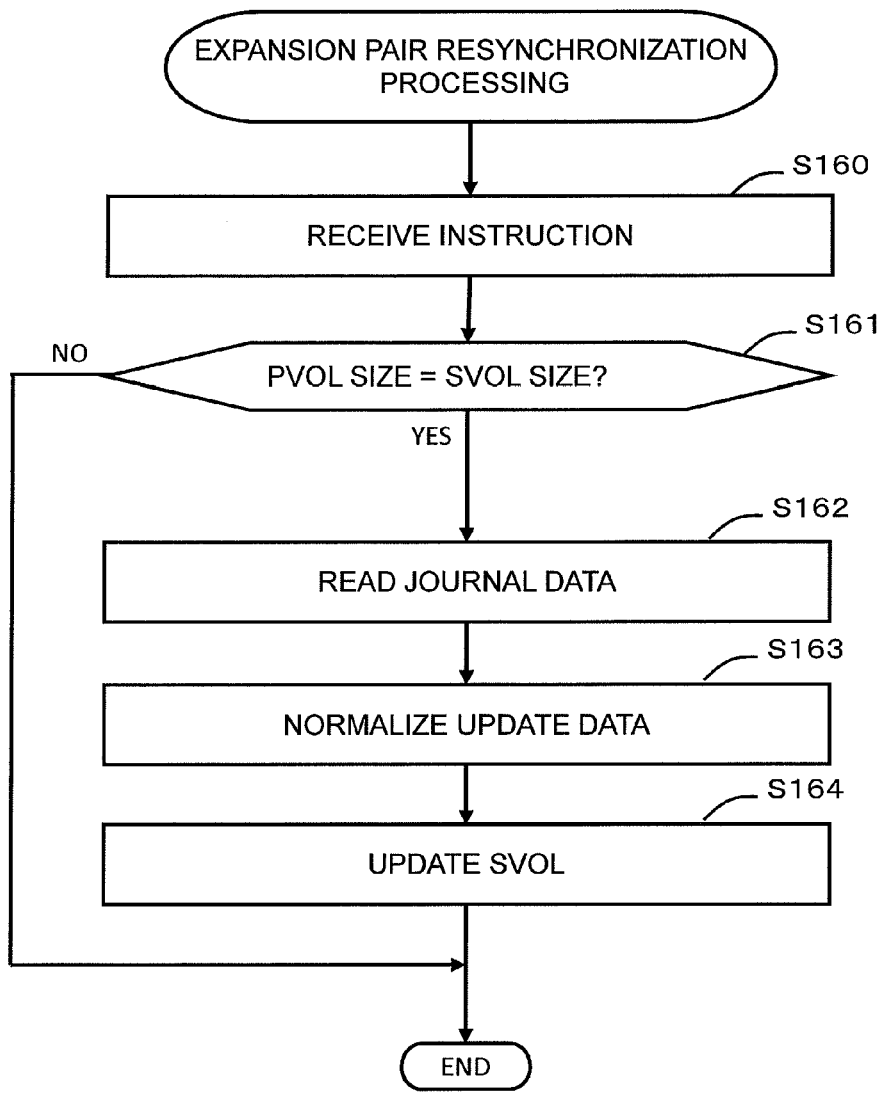
FIG. 25 is a flowchart showing an expansion pair resynchronization processing according to the embodiment 2.

FIG. 25 is a flowchart showing the expansion pair resynchronization processing according to the embodiment 2. This processing is performed by the controller 11C of the copy destination in response to an instruction from the secondary volume expansion processing. The secondary volume expansion processing using the expansion pair resynchronization processing corresponds to the difference update processing described above. A copy pair specified by the secondary volume expansion processing is referred to as a target copy pair herein.

First, the controller 11C receives an instruction for the expansion pair resynchronization processing from the secondary volume expansion processing (S160) and then determines whether or not the size of the primary volume 13 is equal to the size of the secondary volume 14 (S161).

If it is determined that the size of the primary volume 13 is not equal to the size of the secondary volume 14 (if NO in S161), the controller 11C ends the flow.

If it is determined that the size of the primary volume 13 is equal to the size of the secondary volume 14 (if YES in S161), the controller 11C reads the journal data from the journal volume 15C into the cache memory 116C (S162). Then, the controller 11C normalizes update data based on the read journal data to create update data and writes the update data to the cache memory 116C (S163). Then, the controller 11C writes the created update data from the cache memory 116C to the expansion area in the secondary volume 14 (S164) and ends the flow.

An expansion pair resynchronization processing has been described. With this processing, after the size of the secondary volume 14 is expanded, the data in the secondary volume 14 can be made to comply with the data in the primary volume 13, while maintaining the target copy pair in the pair state. In addition, since only the update data in the expansion area is written to the secondary volume 14, the time required for resynchronization can be reduced.

Embodiment 3

In an embodiment 3, a storage system 40 will be described which has a parallel three site (multi-target) configuration in which a storage apparatus 10 is provided at each of a main site, a remote site B and a remote site C, a copy pair is formed between the main site and the remote site B, and a copy pair is formed between the main site and the remote site C.

The computer system has the same configuration as that according to the embodiment 1.

According to this embodiment, the storage apparatus 10A including the primary volume 13 is provided at the main site. The storage apparatus 10B including the secondary volume 14B is provided at the remote site B. The storage apparatus 10C including the secondary volume 14C is provided at the remote site C. The distance between the main site and the remote site B is shorter than the distance between the main site and the remote site C. The primary volume 13 and the secondary volume 14B form a copy pair B. The primary volume 13 and the secondary volume 14C form a copy pair C.

When the storage system 40 expands the size of the logical volumes forming a copy pair, the storage system 40 first expands the size of the primary volume 13. This allows the copy pair state to be maintained to be the pair state.

Specific Examples of Operations of Storage System 40

In the following, several specific examples of operations performed after the primary volume 13 is expanded will be described.

Here, an existing area update processing, which is a processing of updating the existing area, will be described.

Figure 26:
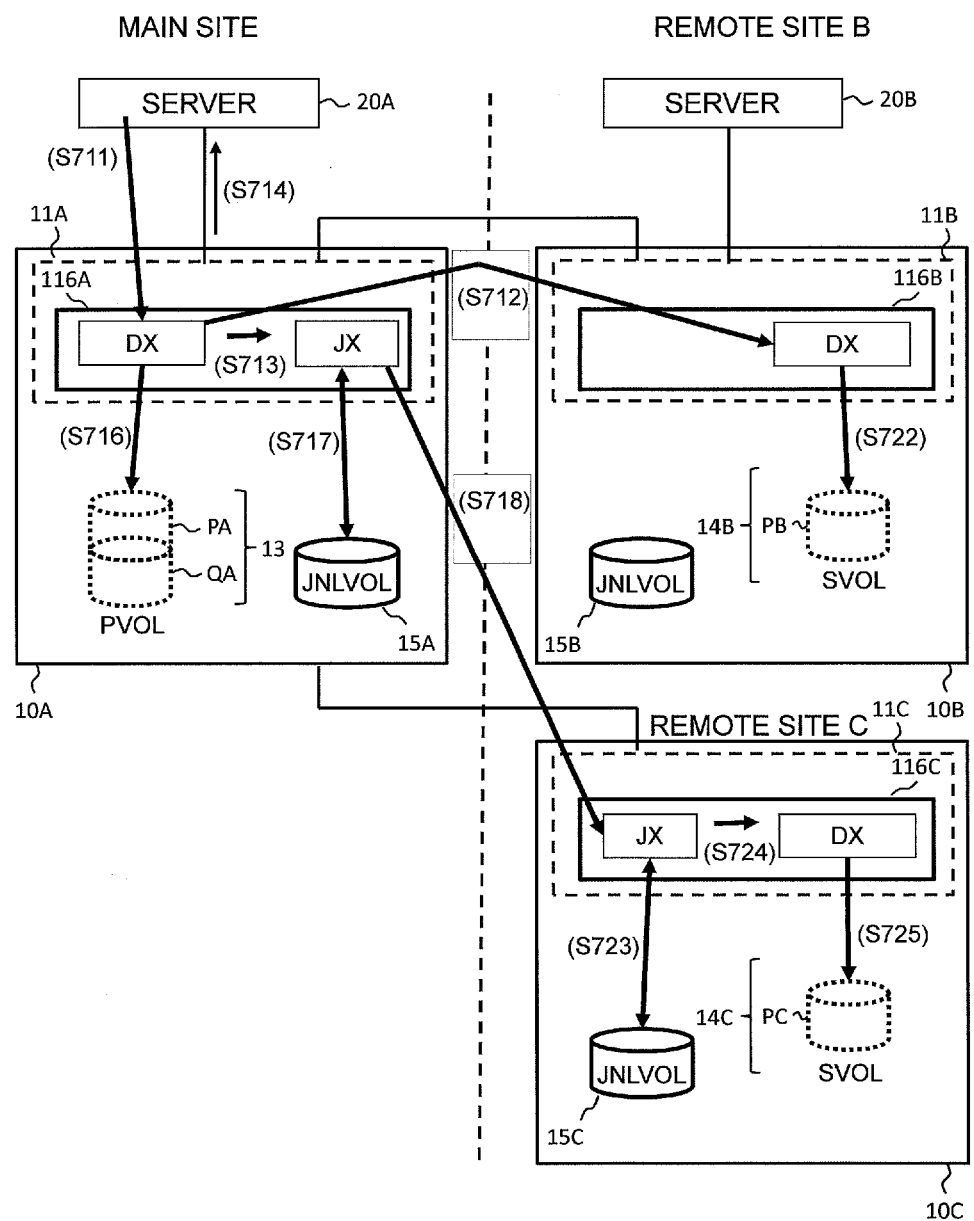
FIG. 26 is a schematic diagram showing an existing area update processing according to an embodiment 3.

FIG. 26 is a schematic diagram illustrating an existing area update processing according to the embodiment 3. First, when the controller 11A at the main site receives a write request from the server 20A, the controller 11A writes the data DX to the cache memory 116A (S711). The write request specifies the existing area PA in the primary volume 13 as the destination of the data DX.

Then, the controller 11A transmits the data DX from the cache memory 116a to the storage apparatus 10B at the remote site B (S172). Then, the controller 11A creates the journal data JX from the data DX in the cache memory 116A and writes the journal data JX to the cache memory 116A (S713). Then, the controller 11A transmits a reply to the server 20A to notify the server 20A of the completion of the write operation (S714).

Then, the controller 11A destages the data DX from the cache memory 116A to the existing area PA in the primary volume 13 asynchronously with the transmission of the data DX (S716). In addition, the controller 11A destages the journal data JX from the cache memory 116A to the journal volume 15A asynchronously with the destaging of the data DX (S717).

Besides, the controller 11C in the storage apparatus 10C reads the journal data JX from the storage apparatus 10A asynchronously with the destaging of the journal data JX, and the controller 11A transmits the journal data JX from the cache memory 116A to the storage apparatus 10C at the remote site C (S718).

Then, the controller 11B destages the data DX from the cache memory 116B to the existing area PB in the secondary volume 14 (S722).

Then, the controller 11C destages the journal data JX from the cache memory 116C to the journal volume 15C (S723). In addition, the controller 11C normalizes the data DX based on the journal data JX asynchronously with the destaging of the journal data JX (S724). Then, the controller 11C destages the data DX from the cache memory 116C to the existing area PC in the secondary volume 14 (S725).

An existing area update processing has been described above. According to this processing, the write data to the existing area is transferred by synchronous copy from the main site to the remote site B, and the journal data to the existing area is transferred by asynchronous copy from the main site to the remote site C. Consequently, even when the size of the primary volume 13 is being expanded, the copy pair formed between the main site and the remote site B is maintained in the pair state, and the copy pair formed between the main site and the remote site C is also maintained in the pair state.

Next, an expansion area update processing, which is a processing of updating the expansion area, will be described.

Figure 27:
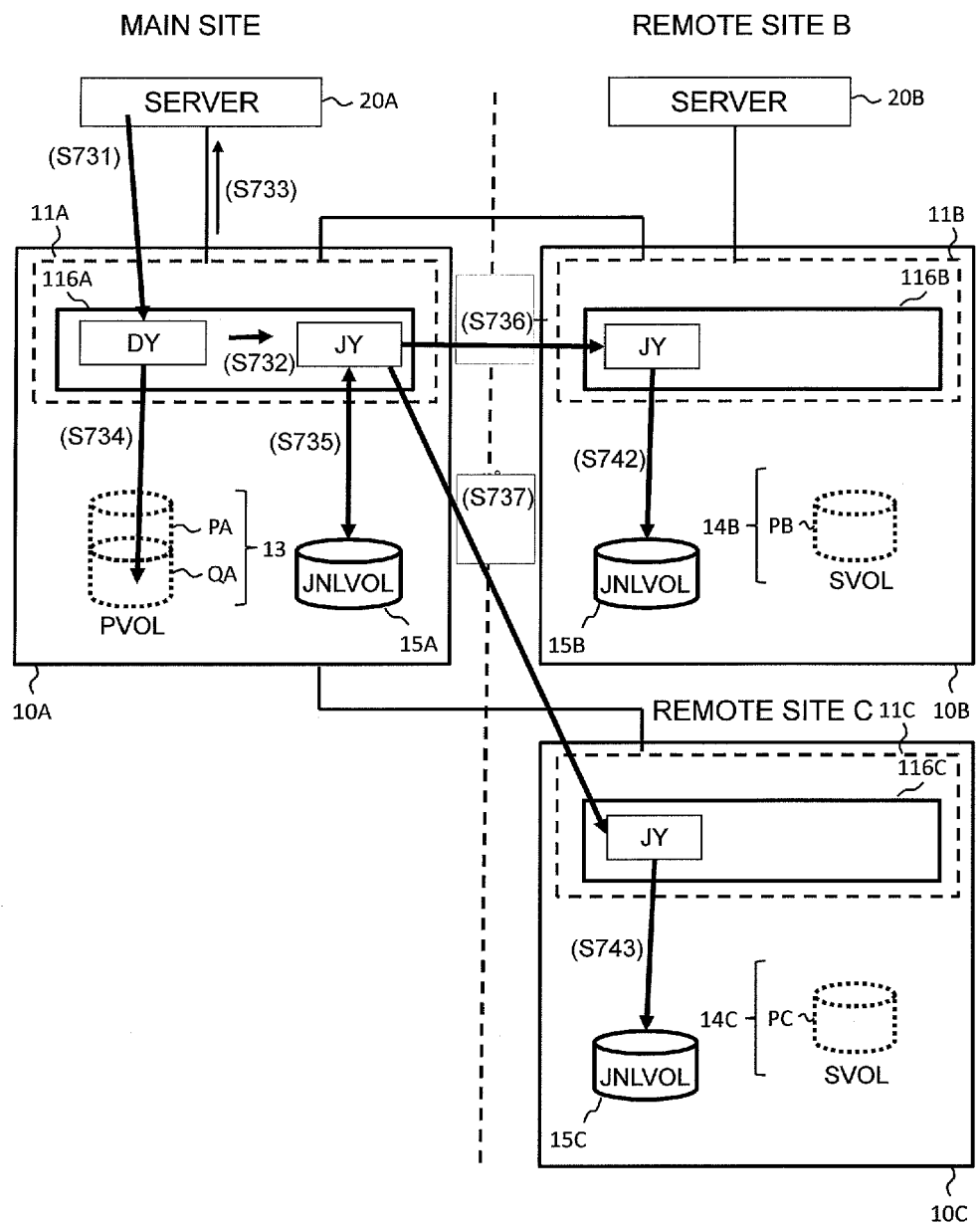
FIG. 27 is a schematic diagram showing an expansion area update processing according to the embodiment 3.

FIG. 27 is a schematic diagram illustrating an expansion area update processing according to the embodiment 3. First, when the controller 11A receives a write request from the server 20A, the controller 11A writes the data DY to the cache memory 116A (S731). The write request specifies the expansion area QA in the primary volume 13 as the destination of the data DY.

Then, the controller 11A creates the journal data JY from the data DY in the cache memory 116A and writes the journal data JY to the cache memory 116A (S732). Then, the controller 11A transmits a reply to the server 20A to notify the server 20A of the completion of the write operation (S733).

Then, the controller 11A destages the data DY from the cache memory 116A to the expansion area QA in the primary volume 13 asynchronously with the transmission of the journal data JY (S734). In addition, the controller 11A destages the journal data JY from the cache memory 116A to the journal volume 15A asynchronously with the destaging of the data DY (S735).

Then, the controller 11B in the storage apparatus 10B reads the journal data JY from the storage apparatus 10A asynchronously with the destaging of the journal data JY, and the controller 11A transmits the journal data JY from the cache memory 116A to the storage apparatus 10B (S736). Besides, the controller 11C in the storage apparatus 10C reads the journal data JY from the storage apparatus 10A asynchronously with the destaging of the journal data JY, and the controller 11A transmits the journal data JY from the cache memory 116A to the storage apparatus 10C (S737).

Besides, the controller 11B destages the journal data JY from the cache memory 116B to the journal volume 15B (S742). Similarly, the controller 11C destages the journal data JY from the cache memory 116C to the journal volume 15C (S743).

An expansion area update processing has been described above. According to this processing, the journal data to the expansion area is transferred by asynchronous copy from the main site to the remote site B, and the journal data to the expansion area is transferred by asynchronous copy from the main site to the remote site C. Consequently, even when the size of the primary volume 13 is being expanded, the copy pair formed between the main site and the remote site B is maintained in the pair state, and the copy pair formed between the main site and the remote site C is also maintained in the pair state.

Next, a difference update processing, which is a processing performed when the secondary volume 14 is expanded after the primary volume 13 is expanded, will be described.

Figure 28:
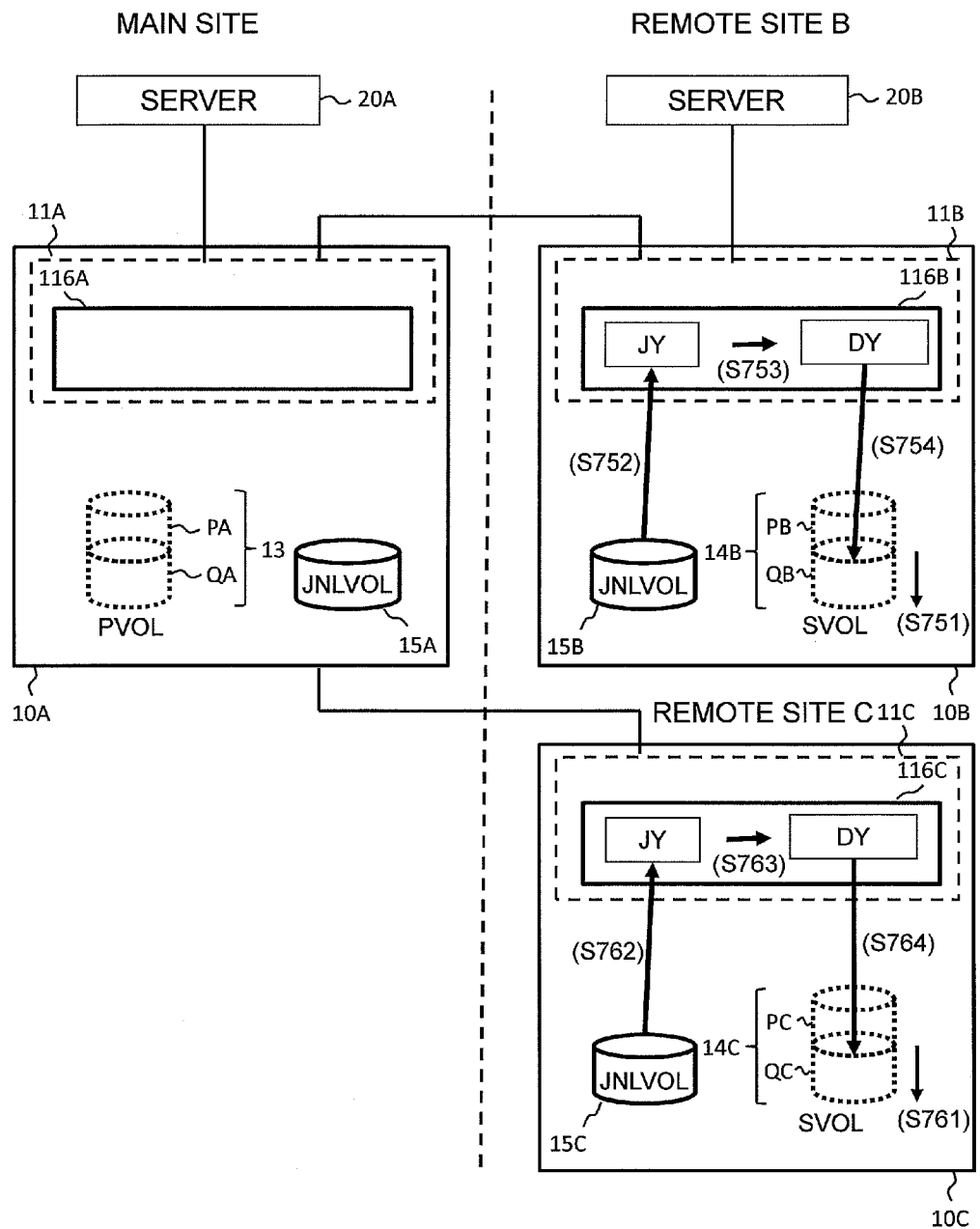
FIG. 28 is a schematic diagram showing a difference update processing according to the embodiment 3.

FIG. 28 is a schematic diagram illustrating a difference update processing according to the embodiment 3. First, the controller 11B expands the secondary volume 14B in response to an instruction from the management server 30 (S751). Then, the controller 11B restores the journal data JY from the journal volume 15B into the cache memory 116B (S752). Then, the controller 11B normalizes the data DY based on the restored journal data JX (S753). Then, the controller 11B destages the data DY from the cache memory 116B to the expansion area QB in the secondary volume 14B (S754).

The controller 11C performs steps S761 to S764, which are the same as the steps S751 to S754, asynchronously with the controller 11B.

Either of the size expansions of the secondary volumes 14B and 14C can be performed first.

A difference update processing has been described above. With this processing, the size of the secondary volumes 14B and 14C can be expanded at any time after the size of the primary volume 13 is expanded. In addition, even when the size of the secondary volume 14B or 14C is being expanded, the copy pair formed between the main site and the remote site B is maintained in the pair state, and the copy pair formed between the main site and the remote site C is also maintained in the pair state.

When a failure occurs at the main site because of a disaster or the like, the remote site B takes the place of the main site, and the secondary volume 14B serving as a new primary volume 13 and the secondary volume 14C serving as a new secondary volume 14 form a copy pair.

According to the conventional three site configuration, size expansion of the logical volumes has to occur concurrently at the three sites. In order to achieve this, both the two copy pairs have to be brought into the suspend state.

According to this embodiment, the copy pair B involves synchronous copy in the case of an update of the existing area and asynchronous copy in the case of an update of the expansion area. The copy pair C involves asynchronous copy in both cases of an update of the existing area and an update of the expansion area. Consequently, even when the size of the logical volumes forming the copy pairs B and C is expanded, both the copy pairs B and C can be maintained in the pair state. In addition, the size of the secondary volumes 14B and 14C can be expanded at any time after the size of the primary volume 13 is expanded. In addition, since synchronous copy of the existing area occurs between the main site and the remote site B, which is closer to the main site than the remote site C, the probability that the remote site B stores the latest data can be increased, and the probability of occurrence of data loss in the case of a failure at the main site can be decreased.

Embodiment 4

In an embodiment 4, a storage system 40 will be described which has a serial three site (cascade) configuration in which a copy pair is formed between the main site and the remote site B, and a copy pair is formed between the remote site B and the remote site C.

The computer system has the same configuration as that according to the embodiment 3.

The primary volume 13 and the secondary volume 14B form a copy pair B. The primary volume 13 and the secondary volume 14C form a copy pair C.

Specific Examples of Operations of Storage System 40

In the following, several specific examples of operations performed after the primary volume 13 is expanded will be described.

Here, an existing area update processing, which is a processing of updating the existing area, will be described.

Figure 29:
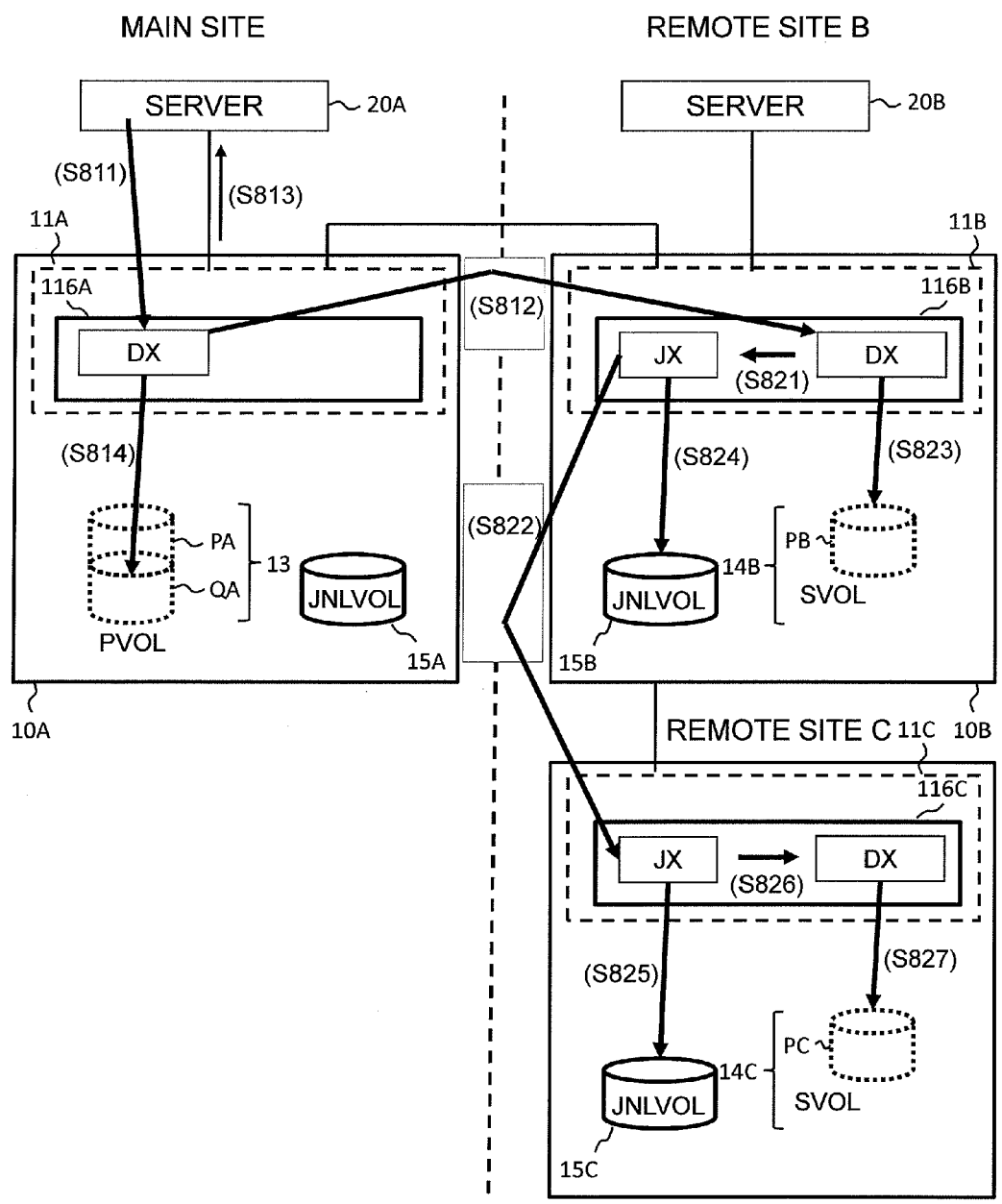
FIG. 29 is a schematic diagram showing an existing area update processing according to an embodiment 4.

FIG. 29 is a schematic diagram illustrating an existing area update processing according to the embodiment 4. First, when the controller 11A at the main site receives a write request from the server 20A, the controller 11A writes the data DX to the cache memory 116A (S811). The write request specifies the existing area PA in the primary volume 13 as the destination of the data DX.

Then, the controller 11A transmits the data DX from the cache memory 116A to the storage apparatus 10B at the remote site B (S812). Then, the controller 11A transmits a reply to the server 20A to notify the server 20A of the completion of the write operation (S813).

Then, the controller 11A destages the data DX from the cache memory 116A to the existing area PA in the primary volume 13 asynchronously with the transmission of the data DX (S814).

The controller 11B receives the data DX, stores the data DX in the cache memory 116B, creates the journal data JX from the data DX in the cache memory 116B and writes the journal data JX to the cache memory 116B (S821). Then, the controller 11C in the storage apparatus 10C reads the journal data JX from the storage apparatus 10B asynchronously with the creation of the journal data JX, and the controller 11B transmits the journal data JX from the cache memory 116B to the storage apparatus 10C (S822).

Then, the controller 11B destages the data DX from the cache memory 116B to the existing area PB in the secondary volume 14 asynchronously with the transmission of the journal data JX (S823). In addition, the controller 11B destages the journal data JX from the cache memory 116B to the journal volume 15B asynchronously with the transmission of the journal data JX (S824).

The controller 11C receives the journal data JX, stores the journal data JX in the cache memory 116C and destages the journal data JX from the cache memory 116C to the journal volume 15C (S825). In addition, the controller 11C normalizes the data DX based on the journal data JX asynchronously with the destaging of the journal data JX (S826). Then, the controller 11C destages the data DX from the cache memory 116C to the existing area PC in the secondary volume 14C (S827).

An existing area update processing has been described above.

Next, an expansion area update processing, which is a processing of updating the expansion area, will be described.

Figure 30:
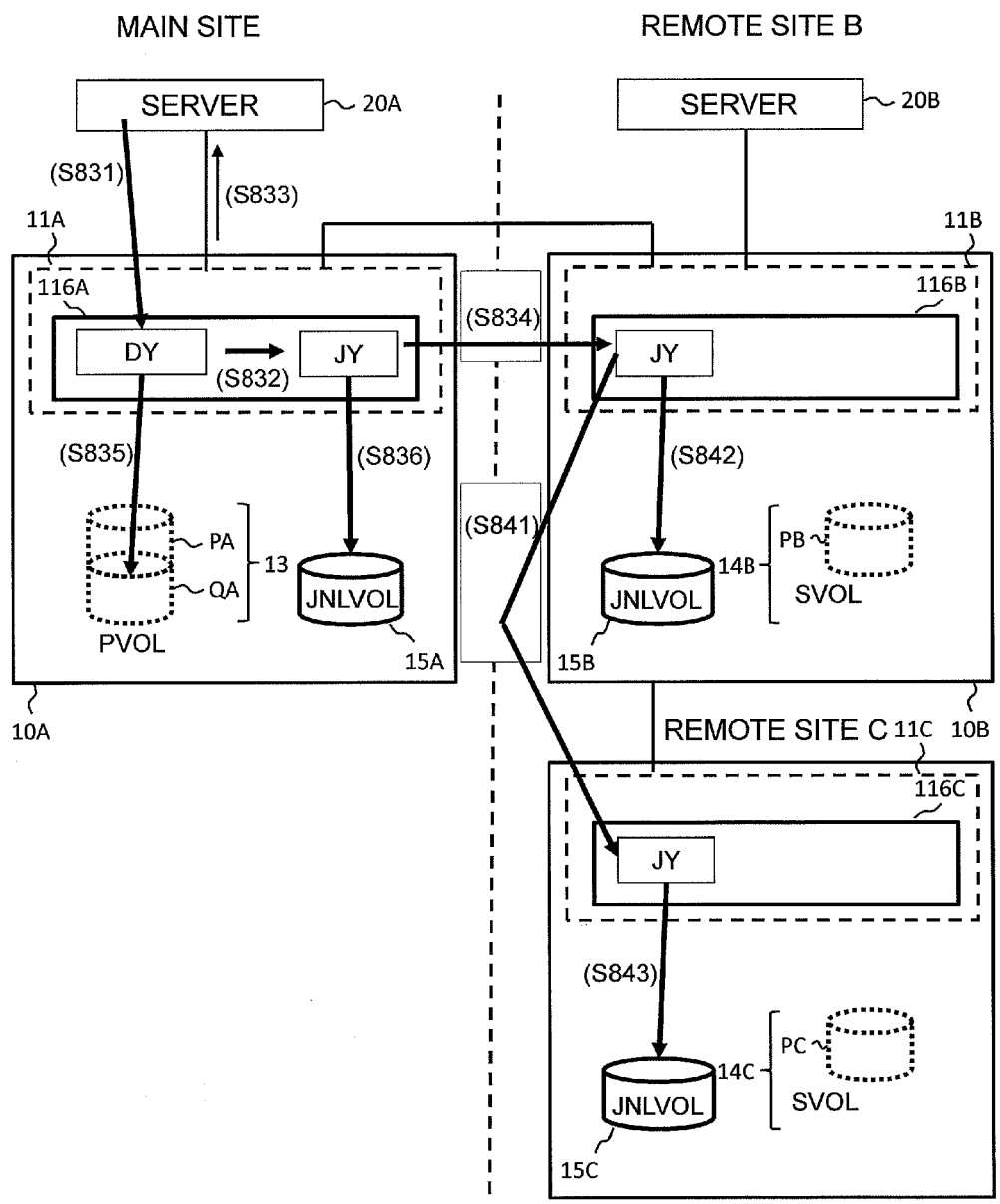
FIG. 30 is a schematic diagram showing an expansion area update processing according to the embodiment 4.

FIG. 30 is a schematic diagram illustrating an expansion area update processing according to the embodiment 4. First, when the controller 11A receives a write request from the server 20A, the controller 11A writes the data DY to the cache memory 116A (S831). The write request specifies the expansion area QA in the primary volume 13 as the destination of the data DY.

Then, the controller 11A creates the journal data JY from the data DY in the cache memory 116A and writes the journal data JY to the cache memory 116A (S832). Then, the controller 11A transmits a reply to the server 20A to notify the server 20A of the completion of the write operation (S833).

Then, the controller 11B in the storage apparatus 10B reads the journal data JY from the storage apparatus 10A asynchronously with the creation of the journal data JY, and the controller 11A transmits the journal data JY from the cache memory 116A to the storage apparatus 10B (S834).

Then, the controller 11A destages the data DY from the cache memory 116A to the expansion area QA in the primary volume 13 asynchronously with the transmission of the journal data JY (S835). In addition, the controller 11A destages the journal data JY from the cache memory 116A to the journal volume 15A asynchronously with the destaging of the data DY (S836).

Besides, the controller 11B receives the journal data JY and writes the journal data JY to the cache memory 116B. The controller 11C in the storage apparatus 10C reads the journal data JY from the storage apparatus 10B asynchronously with the writing of the journal data JY, and the controller 11B transmits the journal data JY from the cache memory 116B to the storage apparatus 10C (S841).

Besides, the controller 11B destages the journal data JY from the cache memory 116B to the journal volume 15B asynchronously with the transmission of the journal data JY (S842).

Besides, the controller 11C writes the journal data JY to the cache memory 116C and destages the journal data JY from the cache memory 116C to the journal volume 15C (S843).

An expansion area update processing has been described above.

According to the existing area update processing and the expansion area update processing, the journal data is transferred by asynchronous copy from the main site to the remote site B, and the same journal data is transferred from the remote site B to the remote site C. Consequently, even when the size of the primary volume 13 is being expanded, the copy pair formed between the main site and the remote site B is maintained in the pair state, and the copy pair formed between the main site and the remote site C is also maintained in the pair state.

Next, a difference update processing, which is a processing performed when the secondary volume 14 is expanded after the primary volume 13 is expanded, will be described.

Figure 31:
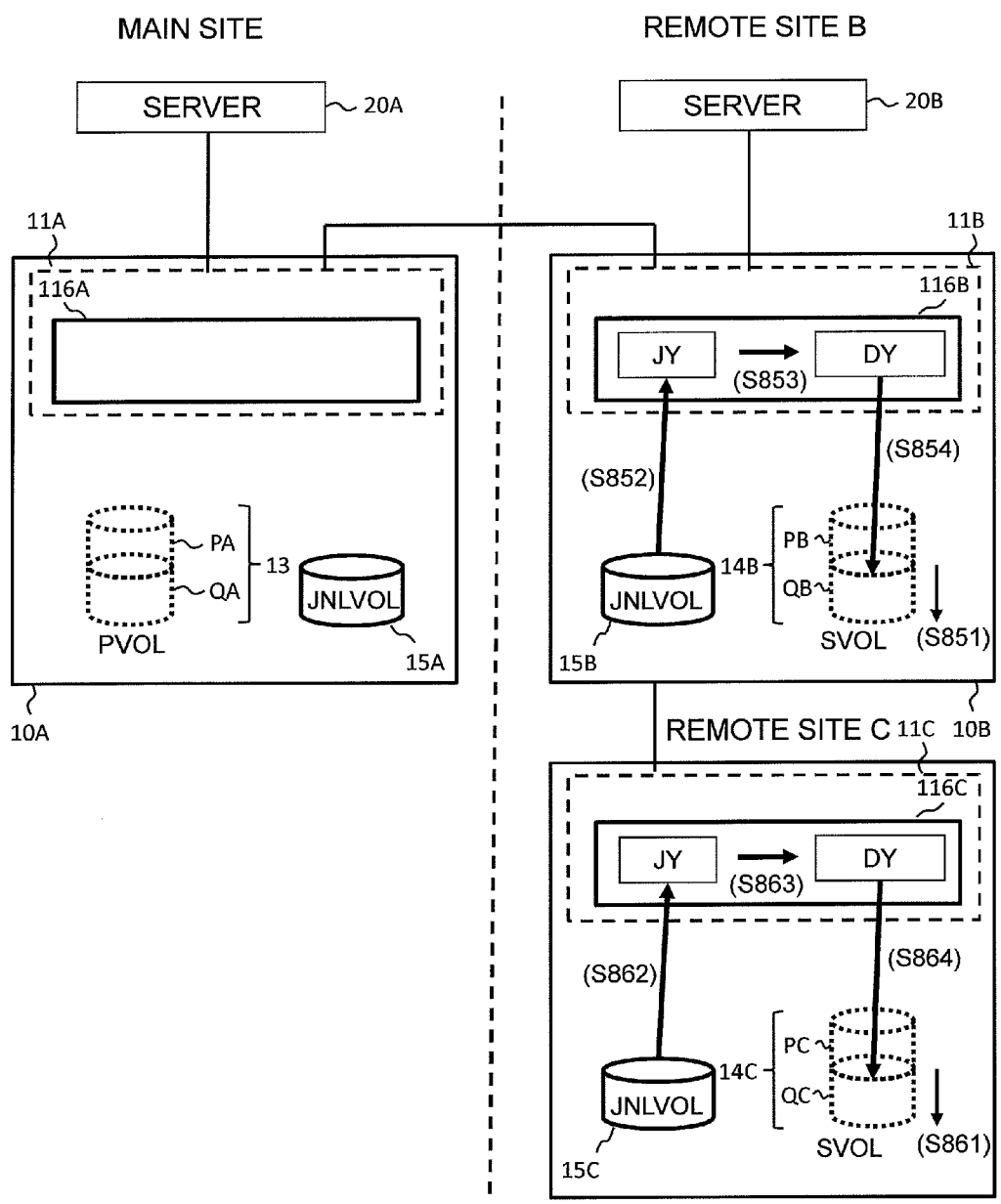
FIG. 31 is a schematic diagram showing a difference update processing according to the embodiment 4.

FIG. 31 is a schematic diagram illustrating a difference update processing according to the embodiment 4. Steps S851 to S854 performed by the controller 11B in this embodiment are the same as the steps S751 to S754 performed by the controller 11B in the difference update processing according to the embodiment 3. Furthermore, steps S861 to S864 performed by the controller 11C in this embodiment are the same as the steps S761 to S764 performed by the controller 11B in the difference update processing according to the embodiment 3.

A difference update processing has been described above. With this processing, the size of the secondary volumes 14B and 14C can be expanded at any time after the size of the primary volume 13 is expanded. In addition, even when the size of the secondary volume 14B or 14C is being expanded, the copy pair formed between the main site and the remote site B is maintained in the pair state, and the copy pair formed between the main site and the remote site C is also maintained in the pair state.

Either of the size expansions of the secondary volumes 14B and 14C can be performed first.

When a failure occurs at the main site because of a disaster or the like, the remote site B takes the place of the main site, and the secondary volume 14B serving as a new primary volume 13 and the secondary volume 14C serving as a new secondary volume 14 form a copy pair.

According to this embodiment, the copy pair B involves synchronous copy in the case of an update of the existing area and asynchronous copy in the case of an update of the expansion area. The copy pair C involves asynchronous copy in both cases of an update of the existing area and an update of the expansion area. Consequently, even when the size of the logical volumes forming the copy pairs B and C is expanded, both the copy pairs B and C can be maintained in the pair state. In addition, the size of the secondary volumes 14B and 14C can be expanded at any time after the size of the primary volume 13 is expanded. In addition, since synchronous copy of the existing area occurs between the main site and the remote site B, which is closer to the main site than the remote site C, the probability that the remote site B stores the latest data can be increased, and the probability of occurrence of data loss in the case of a failure at the main site can be decreased.

The storage system 40 according to each of the embodiments described above can also reduce the size of the expanded logical volume. To achieve this, the expanded logical volume may be deleted and restored into the pool 122, or the unnecessary page in the expanded logical volume may be discarded and restored into the pool 122.

The storage system 40 according to each of the embodiments described above can perform remote copy without depending on the processing of or load on the host computer of the server 20 or the like that issues an IO request to the storage apparatus 10.

The steps in the process flows described above can occur in different orders. For example, the steps S53 and S54 can be interchanged, the steps S55 and S56 can be interchanged, and the steps S152 to S154 and the steps S156 to S158 can be interchanged.

The technique described above with regard to the embodiments can be expressed as follows.

(Expression 1)

A storage system, comprising:

a first storage device;

a first controller that creates a first logical volume using said first storage device;

a second storage device; and a second controller that is connected to said first controller via a network and creates a second logical volume using said second storage device, wherein said first controller defines an existing pair that represents a copy from a first existing area that is a storage area of said first logical volume before size expansion to a second existing area that is a storage area of said second logical volume before size expansion, said first controller maintains said existing pair in a synchronous state, which is a state where said second existing area is in synchronization with said first existing area, said first controller expands the size of said first logical volume by adding a first expansion area using said first storage device to said first logical volume during said synchronous state, and said second controller expands the size of said second logical volume by adding a second expansion area using said second storage device to said second logical volume after the size of said first logical volume is expanded, and writes data written to said first expansion area to said second expansion area.

(Expression 2)

A control method for a storage system, wherein a first controller creates a first logical volume using a first storage device, a second controller connected to said first controller via a network creates a second logical volume using a second storage device, said first controller defines an existing pair that represents a copy from a first existing area that is a storage area of said first logical volume before size expansion to a second existing area that is a storage area of said second logical volume before size expansion, said first controller maintains said existing pair in a synchronous state, which is a state where said second existing area is in synchronization with said first existing area, said first controller expands the size of said first logical volume by adding a first expansion area using said first storage device to said first logical volume during said synchronous state, and said second controller expands the size of said second logical volume by adding a second expansion area using said second storage device to said second logical volume after the size of said first logical volume is expanded, and writes data written to said first expansion area to said second expansion area.

Terms used in these expressions will be described. The first storage device corresponds to the storage device 16 in the storage apparatus 10A at the main site, for example. The first logical volume corresponds to the primary volume 13, for example. The first controller corresponds to the controller 11A in the storage apparatus 10A at the main site, for example. The second storage device corresponds to the storage device 16 in the storage apparatus 10B or 10C at the remote site B or C, for example. The second logical volume corresponds to the secondary volume 14B or 14C, for example. The second controller corresponds to the controller 11B or 11C in the storage apparatus 10B or 10C at the remote site B or C, for example. The first existing area corresponds to the existing area PA, for example. The second existing area corresponds to the existing area PB or PC, for example. The first expansion area corresponds to the expansion area QA, for example. The second expansion area corresponds to the expansion area QB or QC, for example.

REFERENCE SIGNS LIST 10, 10A, 10B, 10C storage apparatus
11, 11A, 11B, 11C controller
13 primary volume
14, 14B, 14C, 14D secondary volume
15, 15A, 15B, 15C journal volume
16, 16A, 16B, 16C storage device
20, 20A, 20B server
30 management server
40 storage system

The invention claimed is:

1. A storage system, comprising:

a first storage device;

a first controller that creates a first logical volume using said first storage device;

a second storage device; and a second controller that is connected to said first controller via a network and creates a second logical volume using said second storage device, wherein said first controller defines an existing pair that represents a copy from a first existing area that is a storage area of said first logical volume before size expansion to a second existing area that is a storage area of said second logical volume before size expansion, said first controller maintains said existing pair in a synchronous state, which is a state where said second existing area is in synchronization with said first existing area, said first controller expands the size of said first logical volume by adding a first expansion area using said first storage device to said first logical volume during said synchronous state, and said second controller expands the size of said second logical volume by adding a second expansion area using said second storage device to said second logical volume after the size of said first logical volume is expanded, and writes data written to said first expansion area to said second expansion area;

wherein said first logical volume and said second logical volume are thin provisioning volumes;

wherein said first controller receives write data to be written to said first logical volume from a host computer, determines whether or not a destination of said write data is said first existing area, and transmits said write data to said second controller and writes said write data to said first existing area if said destination is said first existing area, and said second controller receives said write data from said first controller and writes said received write data to said second logical volume;

wherein if said destination is said first expansion area, said first controller saves destination information that indicates the destination in said first expansion area, reads data represented by said destination information from said first expansion area, and transmits the data to said second controller after the size of said second logical volume is expanded, and said second controller receives said transmitted data and writes the data to said second expansion area; and wherein said first controller defines an expansion pair that represents a copy from said first expansion area to said second expansion area after the size of said first logical volume is expanded, and maintains said expansion pair in a suspend state, which is a state where only said first expansion area of said expansion pair is updated, and said first controller synchronizes said second expansion area with said first expansion area by bringing said expansion pair into the synchronous state after the size of said second logical volume is expanded.

2. A storage system according to claim 1, wherein said first controller receives write data to be written to said first logical volume from a host computer, creates journal data that indicates a history of said write data, and transmits said journal data to said second controller, and said second controller receives and saves said journal data.

3. A storage system according to claim 2, wherein said second controller determines whether or not a destination of said write data is said first existing area and create said write data from said journal data and writes said created write data to said second existing area if said destination is said first existing area.

4. A storage system according to claim 3, wherein if said destination is said first expansion area, said second controller creates said write data from said journal data and writes said created write data to said second expansion area after the size of said second logical volume is expanded.

5. A storage system according to claim 1, further comprising:

a third storage device; and a third controller that is connected to said first controller via a network and creates a third logical volume using said third storage device, wherein said first controller creates journal data that indicates a history of said write data and transmits said journal data to said third controller, and said third controller receives and saves said journal data.

6. A storage system according to claim 5, wherein if said destination is said first expansion area, said first controller transmits said journal data to said second controller, and said second controller receives and saves said journal data.

7. A storage system according to claim 1, further comprising:

a third storage device; and a third controller that is connected to said first controller via a network and creates a third logical volume using said third storage device, wherein said second controller receives said write data from said first controller, creates journal data that indicates a history of said write data and transmits said journal data to said third controller, and said third controller receives and saves said journal data.

8. A storage system according to claim 7, wherein if said destination is said first expansion area, said first controller creates said journal data and transmits said journal data to said second controller, and said second controller receives and saves said journal data.

* * * * *